United States Patent
Isshiki et al.

(10) Patent No.: US 11,411,220 B2
(45) Date of Patent: Aug. 9, 2022

(54) BINDER COMPOSITION FOR ELECTROCHEMICAL DEVICE, SLURRY COMPOSITION FOR ELECTROCHEMICAL DEVICE FUNCTIONAL LAYER, SLURRY COMPOSITION FOR ELECTROCHEMICAL DEVICE ADHESIVE LAYER, AND COMPOSITE MEMBRANE

(71) Applicant: ZEON CORPORATION, Tokyo (JP)

(72) Inventors: Yasuhiro Isshiki, Tokyo (JP); Kenya Sonobe, Tokyo (JP); Kazuki Asai, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 277 days.

(21) Appl. No.: 16/622,535

(22) PCT Filed: Jun. 29, 2018

(86) PCT No.: PCT/JP2018/024939
§ 371 (c)(1),
(2) Date: Dec. 13, 2019

(87) PCT Pub. No.: WO2019/004459
PCT Pub. Date: Jan. 3, 2019

(65) Prior Publication Data
US 2020/0220174 A1    Jul. 9, 2020

(30) Foreign Application Priority Data

Jun. 29, 2017 (JP) .............................. JP2017-127943

(51) Int. Cl.
*H01M 4/62* (2006.01)
*C08K 5/16* (2006.01)
*C08L 101/02* (2006.01)
*H01G 11/38* (2013.01)
*H01M 50/409* (2021.01)
*H01M 4/13* (2010.01)

(52) U.S. Cl.
CPC .............. *H01M 4/622* (2013.01); *C08K 5/16* (2013.01); *C08L 101/02* (2013.01); *H01G 11/38* (2013.01); *H01M 50/409* (2021.01); *H01M 4/13* (2013.01)

(58) Field of Classification Search
None
See application file for complete search history.

(56) References Cited

U.S. PATENT DOCUMENTS

2012/0251878 A1* 10/2012 Ueki ..................... H01M 4/133
429/211
2013/0288117 A1* 10/2013 Kim .................. H01M 10/0525
429/211

FOREIGN PATENT DOCUMENTS

| DE | 102009019484 A1 * | 1/2011 | ............... C09J 5/00 |
| DE | 102009019484 A1 | 1/2011 | |
| EP | 3588623 A1 | 1/2020 | |
| JP | 2012051999 A * | 3/2012 | |
| JP | 2015153720 A * | 8/2015 | |
| JP | 2015153720 A | 8/2015 | |
| JP | 2016009544 A | 1/2016 | |
| KR | 1020150014800 A | 2/2015 | |

OTHER PUBLICATIONS

Feb. 4, 2021, the Extended European Search Report issued by the European Patent Office in the corresponding European Patent Application No. 18824124.4.
Dec. 31, 2019, International Preliminary Report on Patentability issued in the International Patent Application No. PCT/JP2018/024939.

* cited by examiner

*Primary Examiner* — Daniel S Gatewood
(74) *Attorney, Agent, or Firm* — Kenja IP Law PC

(57) ABSTRACT

Provided is a binder composition for an electrochemical device that has excellent binding capacity and is capable of forming a functional layer that can improve rate characteristics and cycle characteristics of an electrochemical device (for example, a secondary battery). The binder composition for an electrochemical device contains a binder and an organonitrogen compound. The binder is a polymer including at least one functional group selected from the group consisting of a carboxyl group, a hydroxyl group, a cyano group, an amino group, an epoxy group, an oxazoline group, an isocyanate group, and a sulfo group. The organonitrogen compound includes at least one functional group selected from the group consisting of an azo group, a hydrazino group, a hydrazo group, and a nitroso group, has a 5% mass loss temperature of 140° C. or higher, and has a molecular weight of not less than 80 and not more than 1,000.

8 Claims, No Drawings

400
BINDER COMPOSITION FOR ELECTROCHEMICAL DEVICE, SLURRY COMPOSITION FOR ELECTROCHEMICAL DEVICE FUNCTIONAL LAYER, SLURRY COMPOSITION FOR ELECTROCHEMICAL DEVICE ADHESIVE LAYER, AND COMPOSITE MEMBRANE

TECHNICAL FIELD

The present disclosure relates to a binder composition for an electrochemical device, a slurry composition for an electrochemical device functional layer, a slurry composition for an electrochemical device adhesive layer, and a composite membrane.

BACKGROUND

Lithium ion secondary batteries and other non-aqueous batteries, electric double-layer capacitors, and lithium ion capacitors are examples of electrochemical devices that are conventionally used in a wide variety of applications.

Non-aqueous secondary batteries (hereinafter, also referred to simply as "secondary batteries") such as lithium ion secondary batteries have characteristics such as compact size, light weight, high energy-density, and the ability to be repeatedly charged and discharged. A non-aqueous secondary battery generally includes battery components such as electrodes (positive and negative electrodes) and a separator that isolates the positive electrode and the negative electrode from one another and prevents short circuiting between the positive and negative electrodes.

A battery component of a secondary battery may be a component that includes a functional layer containing a binder and optionally containing particles compounded in order to cause the battery component to display a desired function (hereinafter, referred to as "functional particles").

Specifically, there are cases in which a separator of a secondary battery is a separator that includes, on a separator substrate, an adhesive layer that contains a binder or a porous membrane layer that contains a binder and non-conductive particles serving as functional particles. Moreover, there are cases in which an electrode of a secondary battery is an electrode that includes an electrode mixed material layer containing a binder and electrode active material particles serving as functional particles on a current collector or an electrode that includes an adhesive layer or a porous membrane layer such as described above on an electrode substrate including an electrode mixed material layer on a current collector.

Attempts have been made to improve binder compositions containing binders with the aim of further enhancing secondary battery performance. In one example, Patent Literature (PTL) 1 proposes a technique for improving adhesiveness of an electrode mixed material layer to a current collector by using a specific binder composition.

CITATION LIST

Patent Literature

PTL 1: JP 2016-009544 A

SUMMARY

Technical Problem

However, with the conventional technique described above, it is difficult to ensure that an electrode mixed material layer has sufficient adhesiveness (peel strength), and it has not been possible to cause a secondary battery to display excellent rate characteristics and cycle characteristics. Therefore, there is room for improvement over the conventional technique in terms of providing a functional layer, such as an electrode mixed material layer, with excellent adhesiveness (peel strength) and improving rate characteristics and cycle characteristics of a secondary battery.

Accordingly, an objective of the present disclosure is to provide a binder composition for an electrochemical device that has excellent binding capacity and is capable of forming a functional layer (electrode mixed material layer, porous membrane layer, or adhesive layer) or a composite membrane that can improve rate characteristics and cycle characteristics of an electrochemical device (for example, a secondary battery).

Another objective of the present disclosure is to provide a slurry composition for an electrochemical device functional layer capable of forming a functional layer (electrode mixed material layer, porous membrane layer, or adhesive layer) or a composite membrane that has excellent adhesiveness (peel strength and process adhesiveness) and that can improve rate characteristics and cycle characteristics of an electrochemical device (for example, a secondary battery).

Yet another objective of the present disclosure is to provide a composite membrane that has excellent adhesiveness (peel strength) and that can improve rate characteristics and cycle characteristics of an electrochemical device (for example, a secondary battery).

Solution to Problem

The inventors conducted diligent investigation with the aim of solving the problems set forth above. The inventors discovered that by using a binder composition containing a specific binder and a specific organonitrogen compound to form a functional layer (electrode mixed material layer, porous membrane layer, or adhesive layer) or a composite membrane, adhesiveness (peel strength and process adhesiveness) of the obtained functional layer (electrode mixed material layer, porous membrane layer, or adhesive layer) or composite membrane can be increased while also causing an electrochemical device (for example, a secondary battery) including the functional layer (electrode mixed material layer, porous membrane layer, or adhesive layer) or composite membrane to display excellent rate characteristics and cycle characteristics, and in this manner completed the present disclosure.

Specifically, the present disclosure aims to advantageously solve the problems set forth above by disclosing a binder composition for an electrochemical device comprising a binder and an organonitrogen compound, wherein the binder is a polymer including at least one functional group selected from the group consisting of a carboxyl group (carboxy group), a hydroxyl group, a cyano group (nitrile group), an amino group, an epoxy group, an oxazoline group, an isocyanate group, and a sulfo group, and the organonitrogen compound includes at least one functional group selected from the group consisting of an azo group, a hydrazino group, a hydrazo group, and a nitroso group, has a 5% mass loss temperature of 140° C. or higher, and has a molecular weight of not less than 80 and not more than 1,000. A binder composition that contains a specific binder and a specific organonitrogen compound as set forth above has excellent binding capacity and can, therefore, be used to obtain a functional layer having excellent adhesiveness (peel strength). Moreover, by using a device component (battery component) that includes this functional layer, it is possible to cause an electrochemical device (for example, a secondary battery) to display excellent rate characteristics and cycle characteristics.

In the presently disclosed binder composition for an electrochemical device, it is preferable that the binder includes a carboxyl group (carboxy group), and that carboxyl group (carboxy group) content in the binder is not less than 0.01 mmol and not more than 15 mmol per 1 g of the binder. When the binder includes a carboxyl group (carboxy group) and when the carboxyl group (carboxy group) content in the binder is not less than 0.01 mmol and not more than 15 mmol per 1 g of the binder, binding capacity of the binder composition can be further increased, and adhesiveness (peel strength) of a functional layer and cycle characteristics of an electrochemical device (for example, a secondary battery) can be further improved.

In the presently disclosed binder composition for an electrochemical device, it is preferable that the binder includes a cyano group (nitrile group), and that cyano group (nitrile group) content in the binder is not less than 1.0 mmol and not more than 40 mmol per 1 g of the binder. When the binder includes a cyano group (nitrile group) and when the cyano group (nitrile group) content in the binder is not less than 1.0 mmol and not more than 40 mmol per 1 g of the binder, binding capacity of the binder composition can be further increased, and adhesiveness (peel strength) of a functional layer and rate characteristics of an electrochemical device (for example, a secondary battery) can be further improved.

In the presently disclosed binder composition for an electrochemical device, the organonitrogen compound preferably further includes an amide group. When the organonitrogen compound further includes an amide group, binding capacity of the binder composition can be further increased, and adhesiveness (peel strength) of a functional layer can be further improved.

In the presently disclosed binder composition for an electrochemical device, content of the organonitrogen compound is preferably not less than 0.5 mass % and not more than 85 mass % relative to the binder. When the content of the organonitrogen compound is not less than 0.5 mass % and not more than 85 mass % relative to the binder, binding capacity of the binder composition can be further increased, and adhesiveness (peel strength) of a functional layer and rate characteristics of an electrochemical device (for example, a secondary battery) can be further improved.

Moreover, the present disclosure aims to advantageously solve the problems set forth above by disclosing a slurry composition for an electrochemical device functional layer comprising any one of the binder compositions for an electrochemical device set forth above. When the slurry composition for an electrochemical device functional layer set forth above is used to form a functional layer, adhesiveness (peel strength) of the functional layer can be increased. Moreover, by using a device component (battery component) that includes this functional layer, an electrochemical device (for example, a secondary battery) can be caused to display excellent rate characteristics and cycle characteristics.

The presently disclosed slurry composition for an electrochemical device functional layer can further comprise an electrode active material. When the slurry composition set forth above also contains an electrode active material, the slurry composition can be used to form an electrode mixed material layer that has excellent adhesiveness and can cause a secondary battery to display excellent rate characteristics and cycle characteristics.

Also, the presently disclosed slurry composition for an electrochemical device functional layer can further comprise non-conductive particles.

Furthermore, the present disclosure aims to advantageously solve the problems set forth above by disclosing a slurry composition for an electrochemical device adhesive layer comprising any one of the binder compositions for an electrochemical device set forth above, and not comprising an electrode active material and non-conductive particles. By forming an adhesive layer from the slurry composition for an electrochemical device adhesive layer set forth above, adhesiveness (peel strength and process adhesiveness) of the adhesive layer can be increased. Moreover, by using a device component (battery component) that includes this adhesive layer, an electrochemical device (for example, a secondary battery) can be caused to display excellent rate characteristics and cycle characteristics.

Also, a slurry composition for a porous membrane comprises any one of the binder compositions for an electrochemical device set forth above. By forming a porous membrane from the slurry composition for a porous membrane set forth above, adhesiveness (peel strength) of the porous membrane can be increased. Moreover, by using a device component (battery component) that includes this porous membrane, an electrochemical device (for example, a secondary battery) can be caused to display excellent rate characteristics and cycle characteristics.

Moreover, the present disclosure aims to advantageously solve the problems set forth above by disclosing a composite membrane obtained through a slurry composition for a porous membrane layer or a slurry composition for an adhesive layer corresponding to the slurry composition for an electrochemical device functional layer set forth above being stacked on a separator substrate or introduced into a separator substrate. When the slurry composition for a porous membrane layer or slurry composition for an adhesive layer corresponding to the slurry composition for an electrochemical device functional layer set forth above is stacked on a separator substrate or introduced into a separator substrate, a composite membrane can be reliably formed.

Note that in the present specification, a functional layer that contains a binder and electrode active material particles is referred to as an "electrode mixed material layer", a functional layer that contains a binder and non-conductive particles is referred to as a "porous membrane layer", and a functional layer that contains a binder but contains neither electrode active material particles nor non-conductive particles is referred to as an "adhesive layer". Moreover, a membrane obtained by forming a porous membrane layer or adhesive layer on a separator substrate or in a separator substrate through application or the like of a slurry composition for a porous membrane layer or a slurry composition for an adhesive layer with respect to the separator substrate is referred to as a "composite membrane".

Advantageous Effect

According to the present disclosure, it is possible to provide a binder composition for an electrochemical device that has excellent binding capacity and is capable of forming a functional layer (electrode mixed material layer, porous membrane layer, or adhesive layer) or a composite membrane that can improve rate characteristics and cycle characteristics of an electrochemical device (for example, a secondary battery).

Moreover, according to the present disclosure, it is possible to provide a slurry composition for an electrochemical device functional layer capable of forming a functional layer (electrode mixed material layer, porous membrane layer, or adhesive layer) or a composite membrane that has excellent adhesiveness (peel strength and process adhesiveness) and that can improve rate characteristics and cycle characteristics of an electrochemical device (for example, a secondary battery).

Furthermore, according to the present disclosure, it is possible to provide a composite membrane that has excellent adhesiveness (peel strength) and that can improve rate characteristics and cycle characteristics of an electrochemical device (for example, a secondary battery).

DETAILED DESCRIPTION

The following provides a detailed description of embodiments of the present disclosure.

The presently disclosed binder composition for an electrochemical device is used in production of an electrochemical device (for example, a secondary battery) and can, for example, be used in production of the presently disclosed slurry composition for an electrochemical device functional layer (electrode mixed material layer, porous membrane layer, or adhesive layer). The presently disclosed slurry composition for an electrochemical device functional layer (electrode mixed material layer, porous membrane layer, or adhesive layer) can be used in formation of a composite membrane or any functional layer (for example, an electrode mixed material layer, a porous membrane layer, or an adhesive layer) that has a function such as reinforcement, adhesion, or giving and receiving electrons in an electrochemical device. The electrochemical device (for example, a secondary battery) includes a device component (battery component) that includes a composite membrane or a functional layer (electrode mixed material layer, porous membrane layer, or adhesive layer) for an electrochemical device that is formed from the presently disclosed slurry composition for an electrochemical device functional layer.

(Binder Composition for Electrochemical Device)

The presently disclosed binder composition is a composition containing a binder and an organonitrogen compound that are dissolved and/or dispersed in a solvent. The presently disclosed binder composition may also contain other components besides the binder, the organonitrogen compound, and the solvent.

The presently disclosed binder composition displays excellent binding capacity as a result of containing the organonitrogen compound. This is presumed to be due to interactions, such as hydrogen bonds, between the organonitrogen compound and the binder. Moreover, by using the presently disclosed binder composition, an obtained functional layer (electrode mixed material layer, porous membrane layer, or adhesive layer) or composite membrane can be caused to display excellent adhesiveness (peel strength and process adhesiveness), and device characteristics (battery characteristics) of an electrochemical device (for example, a secondary battery) can be enhanced. Furthermore, as a result of the presently disclosed binder composition containing the organonitrogen compound, the presently disclosed binder composition can be used to produce an electrochemical device having excellent rate characteristics, cycle characteristics, and so forth.

<Binder>

The binder is a component that causes the binder composition to display binding capacity and that, in a functional layer formed on a substrate using a slurry composition containing the binder composition, can hold components such as functional particles so that these components do not become detached from the functional layer and can adhere battery components to one another via the functional layer. The glass-transition temperature of the binder is lower than 250° C., preferably 100° C. or lower, and more preferably 25° C. or lower.

[Type of Binder]

The binder may be any binder that can be used in an electrochemical device such as a secondary battery without any specific limitations. For example, the binder may be a polymer that is obtained through polymerization of a monomer composition containing a monomer that can display binding capacity (i.e., a synthetic polymer such as an addition polymer obtained by addition polymerization). Examples of such polymers include (i) a diene polymer (aliphatic conjugated diene/aromatic vinyl copolymer (polymer including mainly an aliphatic conjugated diene monomer unit and an aromatic vinyl monomer unit) or aliphatic conjugated diene homopolymer), (ii) an acrylate polymer (polymer including mainly a (meth)acrylic acid ester monomer unit), (iii) a fluoropolymer (polymer including mainly a fluorine-containing monomer unit), (iv) a polycarboxylic acid polymer ((meth)acrylic acid/(meth)acrylamide copolymer (polymer including mainly a (meth)acrylic acid monomer unit and a (meth)acrylamide monomer unit) or (meth)acrylic acid homopolymer), and (v) a cyano polymer (acrylonitrile polymer (polymer including mainly a (meth)acrylonitrile monomer unit)). One of these polymers may be used individually, or two or more of these polymers may be used in combination in a freely selected ratio. Of these polymers, (i) a diene polymer, (iv) a polycarboxylic acid polymer, or (v) a cyano polymer is preferable.

Examples of aliphatic conjugated diene monomers that can form an aliphatic conjugated diene monomer unit of (i) a diene polymer, aromatic vinyl monomers that can form an aromatic vinyl monomer unit of (i) a diene polymer, (meth)acrylic acid ester monomers that can form a (meth)acrylic acid ester monomer unit of (ii) an acrylate polymer, fluorine-containing monomers that can form a fluorine-containing monomer unit of (iii) a fluoropolymer, (meth)acrylic acid monomers that can form a (meth)acrylic acid monomer unit of (iv) a polycarboxylic acid polymer, (meth)acrylamide monomers that can form a (meth)acrylamide monomer unit of (iv) a polycarboxylic acid polymer, and (meth)acrylonitrile monomers that can form a (meth)acrylonitrile monomer unit of (v) a cyano polymer include known examples thereof.

The phrase "including a monomer unit" as used in the present disclosure means that "a polymer obtained with the monomer includes a repeating unit derived from the monomer".

Moreover, when a polymer is said to "include mainly" one type or a plurality of types of monomer units, this means that "when the amount of all monomer units included in the polymer is taken to be 100 mass %, the fractional content of the one type of monomer unit or the total fractional content of the plurality of types of monomer units is more than 50 mass %".

Moreover, "(meth)acryl" is used to indicate "acryl" and/or "methacryl", and "(meth)acrylo" is used to indicate "acrylo" and/or "methacrylo" in the present disclosure.

[Functional Group of Binder]

The polymer used as the binder includes a functional group. The functional group included in the binder is at least one of a carboxyl group (carboxy group), a hydroxyl group, a cyano group (nitrile group), an amino group, an epoxy group, an oxazoline group, an isocyanate group, and a sulfo group (hereinafter, these functional groups are also referred to collectively as "specific functional groups"), is preferably at least one of a carboxyl group (carboxy group), a hydroxyl group, and a cyano group (nitrile group), is more preferably at least one of a carboxyl group (carboxy group) and a cyano group (nitrile group), and is particularly preferably at least a carboxyl group (carboxy group) from a viewpoint of improving adhesiveness (peel strength) of a functional layer and rate characteristics of an electrochemical device. Note that one of these functional groups may be used individually, or two or more of these functional groups may be used in combination in a freely selected ratio.

In a case in which the binder includes a carboxyl group (carboxy group), the carboxyl group (carboxy group) content in the binder is preferably 0.01 mmol or more per 1 g of the binder, more preferably 0.1 mmol or more per 1 g of the binder, even more preferably 0.2 mmol or more per 1 g of the binder, further preferably 0.23 mmol or more per 1 g of the binder, even further preferably 0.5 mmol or more per 1 g of the binder, particularly preferably 0.57 mmol or more per 1 g of the binder, and most preferably 0.86 mmol or more per 1 g of the binder, and is preferably 15 mmol or less per 1 g of the binder, more preferably 10 mmol or less per 1 g of the binder, even more preferably 9.69 mmol or less per 1 g of the binder, further preferably 7 mmol or less per 1 g of the binder, particularly preferably 5 mmol or less per 1 g of the binder, and most preferably 4.86 mmol or less per 1 g of the binder.

A carboxyl group (carboxy group) content in the binder of 0.01 mmol or more per 1 g of the binder causes sufficient interaction between the binder and the organonitrogen compound and can further improve adhesiveness (peel strength) of a functional layer, whereas a content of 15 mmol or less per 1 g of the binder can prevent reduction of slurry stability in preparation of a slurry for a functional layer and can further improve cycle characteristics of an electrochemical device.

Note that the carboxyl group (carboxy group) content in the binder can be calculated from charging amounts or can be calculated by measuring acidity of the binder by titration.

In a case in which the binder includes a cyano group (nitrile group), the cyano group (nitrile group) content in the binder is preferably 1 mmol or more per 1 g of the binder, more preferably 2 mmol or more per 1 g of the binder, even more preferably 2.57 mmol or more per 1 g of the binder, further preferably 3 mmol or more per 1 g of the binder, particularly preferably 4 mmol or more per 1 g of the binder, and most preferably 7.36 mmol or more per 1 g of the binder, and is preferably 40 mmol or less per 1 g of the binder, more preferably 35 mmol or less per 1 g of the binder, even more preferably 30 mmol or less per 1 g of the binder, further preferably 21.6 mmol or less per 1 g of the binder, particularly preferably 15 mmol or less per 1 g of the binder, and most preferably 11.3 mmol or less per 1 g of the binder.

A cyano group (nitrile group) content in the binder of 1 mmol or more per 1 g of the binder causes sufficient interaction between the binder and the organonitrogen compound and can improve adhesiveness (peel strength) of a functional layer, whereas a content of 40 mmol or less per 1 g of the binder can prevent aggregation of the binder in preparation of a slurry for a functional layer and can further improve rate characteristics of an electrochemical device.

The cyano group (nitrile group) content in the binder can be calculated from charging amounts or can be calculated by measuring nitrogen content in the binder by the modified Dumas method.

No specific limitations are placed on the method by which the specific functional group is introduced into the polymer. For example, a polymer may be prepared using a monomer that includes any of the specific functional groups set forth above (specific functional group-containing monomer) so as to obtain a polymer including a specific functional group-containing monomer unit, or modification (particularly terminal modification) of any polymer may be carried out to obtain a polymer including any of the specific functional groups set forth above at a terminal thereof. Of these methods, the former is preferable. In other words, the polymer used as the binder includes, as a specific functional group-containing monomer unit, at least one of a carboxyl group-containing (carboxy group-containing) monomer unit, a hydroxyl group-containing monomer unit, a cyano group-containing (nitrile group-containing) monomer unit, an amino group-containing monomer unit, an epoxy group-containing monomer unit, an oxazoline group-containing monomer unit, an isocyanate group-containing monomer unit, and a sulfo group-containing monomer unit, preferably includes at least one of a carboxyl group-containing (carboxy group-containing) monomer unit, a hydroxyl group-containing monomer unit, and a cyano group-containing (nitrile group-containing) monomer unit, more preferably includes at least one of a carboxyl group-containing (carboxy group-containing) monomer unit and a cyano group-containing (nitrile group-containing) monomer unit, and particularly preferably includes at least a carboxyl group-containing (carboxy group-containing) monomer unit.

Examples of carboxyl group-containing (carboxy group-containing) monomers that can form a carboxyl group-containing (carboxy group-containing) monomer unit include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleate.

Examples of acid anhydrides of dicarboxylic acids include maleic anhydride, acrylic anhydride, methylmaleic anhydride, and dimethylmaleic anhydride.

Furthermore, an acid anhydride that produces a carboxyl group (carboxy group) upon hydrolysis can also be used as a carboxyl group-containing (carboxy group-containing) monomer. Of these carboxyl group-containing (carboxy group-containing) monomers, acrylic acid and methacrylic acid are preferable. One carboxyl group-containing (carboxy group-containing) monomer may be used individually, or two or more carboxyl group-containing (carboxy group-containing) monomers may be used in combination in a freely selected ratio.

Examples of hydroxyl group-containing monomers that can form a hydroxyl group-containing monomer unit include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^a$—COO—$(C_qH_{2q}O)_p$—H (where p represents an integer of 2 to 9, q represents an integer of 2 to 4, and $R^a$ represents a hydrogen atom or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; (meth)allyl thioethers of alkylene glycol such as (meth)allyl-2-hydroxyethyl thioether and (meth)allyl-2-hydroxypropyl thioether; and hydroxyl group-containing amides such as N-hydroxymethyl acrylamide (N-methylolacrylamide), N-hydroxymethyl methacrylamide, N-hydroxyethyl acrylamide, and N-hydroxyethyl methacrylamide. One hydroxyl group-containing monomer may be used individually, or two or more hydroxyl group-containing monomers may be used in combination in a freely selected ratio.

In the present disclosure, "(meth)allyl" is used to indicate "allyl" and/or "methallyl", and "(meth)acryloyl" is used to indicate "acryloyl" and/or "methacryloyl".

Examples of cyano group-containing (nitrile group-containing) monomers that can form a cyano group-containing (nitrile group-containing) monomer unit include acrylonitrile, methacrylonitrile, fumaronitrile, allyl cyanide, 2-methylene glutaronitrile, and cyanoacrylate. One cyano group-containing (nitrile group-containing) monomer unit may be used individually, or two or more cyano group-containing (nitrile group-containing) monomer units may be used in combination in a freely selected ratio.

Examples of amino group-containing monomers that can form an amino group-containing monomer unit include dimethylaminoethyl (meth)acrylate, diethylaminoethyl (meth)acrylate, aminoethyl vinyl ether, and dimethylaminoethyl vinyl ether. One amino group-containing monomer may be used individually, or two or more amino group-containing monomers may be used in combination in a freely selected ratio.

In the present disclosure, "(meth)acrylate" is used to indicate "acrylate" and/or "methacrylate".

Examples of epoxy group-containing monomers that can form an epoxy group-containing monomer unit include monomers that include a carbon-carbon double bond and an epoxy group.

Examples of monomers that include a carbon-carbon double bond and an epoxy group include unsaturated glycidyl ethers such as vinyl glycidyl ether, allyl glycidyl ether, butenyl glycidyl ether, and o-allyl phenyl glycidyl ether; monoepoxides of dienes and polyenes such as butadiene monoepoxide, chloroprene monoepoxide, 4,5-epoxy-2-pentene, 3,4-epoxy-1-vinyl cyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid. One epoxy group-containing monomer may be used individually, or two or more epoxy group-containing monomers may be used in combination in a freely selected ratio.

Examples of oxazoline group-containing monomers that can form an oxazoline group-containing monomer unit include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline. One oxazoline group-containing monomer may be used individually, or two or more oxazoline group-containing monomers may be used in combination in a freely selected ratio.

Examples of isocyanate group-containing monomers that can form an isocyanate group-containing monomer unit include 2-acryloyloxyethyl isocyanate and 2-methacryloyloxyethyl isocyanate. One isocyanate group-containing monomer unit may be used individually, or two or more isocyanate group-containing monomer units may be used in combination in a freely selected ratio.

Examples of sulfo group-containing monomers that can form a sulfo group-containing monomer unit include vinyl sulfonic acid, methyl vinyl sulfonic acid, (meth)allyl sulfonic acid, styrene sulfonic acid, 2-acrylamido-2-methylpropane sulfonic acid, and 3-allyloxy-2-hydroxypropane sulfonic acid. One sulfo group-containing monomer may be used individually, or two or more sulfo group-containing monomers may be used in combination in a freely selected ratio.

The fractional content of the specific functional group-containing monomer unit in the polymer when the amount of all monomer units included in the polymer is taken to be 100 mass % is preferably 0.1 mass % or more, and more preferably 1 mass % or more, and is preferably 99 mass % or less, and more preferably 90 mass % or less. When the fractional content of the specific functional group-containing monomer unit in the polymer is within any of the ranges set forth above, adhesiveness (peel strength) of a functional layer and rate characteristics of an electrochemical device can be improved.

[Production Method of Binder]

No specific limitations are placed on the method by which the polymer serving as the binder is produced. The polymer serving as the binder may be produced by, for example, polymerizing a monomer composition containing the monomers described above in an aqueous solvent. The fractional content of each monomer in the monomer composition can be set in accordance with the desired fractional content of the corresponding monomer unit (repeating unit) in the polymer.

The polymerization method is not specifically limited, and any of solution polymerization, suspension polymerization, bulk polymerization, and emulsion polymerization may be used. Examples of types of polymerization reactions that can be used include ionic polymerization, radical polymerization, living radical polymerization, various types of condensation polymerization, and addition polymerization. A known emulsifier or polymerization initiator may be used in the polymerization as necessary.

<Organonitrogen Compound>

The organonitrogen compound is a component that can improve binding capacity of the binder composition containing the binder through addition thereof to the binder composition.

No specific limitations are placed on functional groups included in the organonitrogen compound of the binder composition so long as at least one selected from the group consisting of an azo group, a hydrazino group, a hydrazo group, and a nitroso group is included as a functional group. However, from a viewpoint of interaction with the specific functional group of the binder (i.e., from a viewpoint of adhesiveness (peel strength) of a functional layer), it is preferable that at least one of an azo group, a hydrazino group, and a hydrazo group is included as a functional group, more preferable that at least one of an azo group and a hydrazo group is included as a functional group, and particularly preferable that an azo group is included as a functional group.

The molecular weight of the organonitrogen compound in the binder composition is 80 or more, preferably 90 or more, more preferably 100 or more, even more preferably 110 or more, and particularly preferably 116 or more, and is preferably 1,000 or less, more preferably 600 or less, even more preferably 400 or less, further preferably 200 or less, particularly preferably 186 or less, and most preferably 133 or less. Cycle characteristics of an electrochemical device can be improved when the molecular weight of the organonitrogen compound in the binder composition is 80 or more. On the other hand, adhesiveness (peel strength) of a functional layer can be improved when the molecular weight of the organonitrogen compound in the binder composition is 1,000 or less.

The 5% mass loss temperature of the organonitrogen compound in the binder composition is 140° C. or higher, preferably 150° C. or higher, more preferably 160° C. or higher, particularly preferably 180° C. or higher, and most preferably 200° C. or higher. When the 5% mass loss temperature of the organonitrogen compound in the binder composition is 140° C. or higher, reduction of oxidation resistance and reduction resistance of the organonitrogen compound inside a battery can be prevented, and cycle characteristics of an electrochemical device can be improved.

The organonitrogen compound preferably further includes an amide group. In a case in which the organonitrogen compound further includes an amide group, the amide group content in the organonitrogen compound is preferably 1 mmol or more per 1 g of the organonitrogen compound, more preferably 2.3 mmol or more per 1 g of the organonitrogen compound, even more preferably 3 mmol or more per 1 g of the organonitrogen compound, further preferably 4.4 mmol or more per 1 g of the organonitrogen compound, and particularly preferably 10 mmol or more per 1 g of the organonitrogen compound, and is preferably 30 mmol or less per 1 g of the organonitrogen compound, more preferably 25 mmol or less per 1 g of the organonitrogen compound, particularly preferably 20 mmol or less per 1 g of the organonitrogen compound, and most preferably 17.2 mmol or less per 1 g of the organonitrogen compound.

Adhesiveness (peel strength) of a functional layer can be further improved when the amide group content in the organonitrogen compound is 1 mmol or more per 1 g of the organonitrogen compound, whereas rate characteristics of an electrochemical device can be further improved when the amide group content is 30 mmol or less per 1 g of the organonitrogen compound.

The amide group content in the organonitrogen compound can be calculated from charging amounts, for example.

Specific examples of the organonitrogen compound include, but are not specifically limited to, azodicarbonamide (ADCA; 5% mass loss temperature: 200° C.; molecular weight: 116), oxybis(benzenesulfonyl hydrazide) (OBSH; 5% mass loss temperature: 160° C.; molecular weight: 358), dinitrosopentamethylenetetramine (DPT; 5% mass loss temperature: 205° C.; molecular weight: 184), hydrazo dicarbonamide (HDCA; 5% mass loss temperature: 245° C.; molecular weight: 118), trihydrazine triazine (THT; 5% mass loss temperature: 270° C.; molecular weight: 171), p-toluenesulfonyl semicarbazide (TSSC; 5% mass loss temperature: 230° C.; molecular weight: 229), p,p'-oxybis(benzenesulfonyl semicarbazide) (OBSC; 5% mass loss temperature: 215° C.; molecular weight: 444), barium azodicarboxylate (5% mass loss temperature: 250° C.; molecular weight: 253), p-toluenesulfonyl hydrazide (TSH; 5% mass loss temperature: 140° C.; molecular weight: 186), and 5-methyl-1H-benzotriazole (MBT; 5% mass loss temperature: 315° C.; molecular weight: 133).

One organonitrogen compound may be used individually, or two or more organonitrogen compounds may be used in combination in a freely selected ratio. Of these organonitrogen compounds, azodicarbonamide (ADCA; 5% mass loss temperature: 200° C.; molecular weight: 116), oxybis (benzenesulfonyl hydrazide) (OBSH; 5% mass loss temperature: 160° C.; molecular weight: 358), dinitrosopentamethylenetetramine (DPT; 5% mass loss temperature: 205° C.; molecular weight: 184), and hydrazo dicarbonamide (HDCA; 5% mass loss temperature: 245° C.; molecular weight: 118) are preferable from a viewpoint of further enhancing peel strength and rate characteristics.

Note that the 5% mass loss temperature of an organonitrogen compound can be measured by thermogravimetric analysis, for example.

Also note that the "organonitrogen compound" may be a "foaming organonitrogen compound" such as ADCA, OBSH, DPT, or HDCA, or may be a "non-foaming organonitrogen compound" such as a triazine or imidazole.

The content of the organonitrogen compound relative to 100 mass % of the binder is preferably 0.5 mass % or more, more preferably 1 mass % or more, even more preferably 2 mass % or more, further preferably 5 mass % or more, particularly preferably 10 mass % or more, and most preferably 20 mass % or more, and is preferably 85 mass % or less, more preferably 70 mass % or less, even more preferably 60 mass % or less, further preferably 55 mass % or less, even further preferably 50 mass % or less, particularly preferably 45 mass % or less, and most preferably 35 mass % or less. Adhesiveness (peel strength) of a functional layer can be further improved when the content of the organonitrogen compound is 0.5 mass % or more relative to 100 mass % of the binder. On the other hand, rate characteristics of an electrochemical device can be further improved when the content of the organonitrogen compound is 85 mass % or less relative to 100 mass % of the binder.

<Solvent>

The solvent contained in the binder composition is not specifically limited so long as the binder and the organonitrogen compound set forth above can be dissolved or dispersed therein, and may be either water or an organic solvent. Examples of organic solvents that can be used include acetonitrile, N-methyl-2-pyrrolidone, tetrahydrofuran, acetone, acetylpyridine, cyclopentanone, dimethylformamide, dimethyl sulfoxide, methylformamide, methyl ethyl ketone, furfural, ethylenediamine, dimethylbenzene (xylene), methylbenzene (toluene), cyclopentyl methyl ether, and isopropyl alcohol.

One of these solvents may be used individually, or two or more of these solvents may be used as a mixture in a freely selected mixing ratio.

<Other Components>

In addition to the binder, the organonitrogen compound, and the solvent set forth above, the presently disclosed binder composition may further contain known additives that can be added in a functional layer such as an electrode mixed material layer, a porous membrane layer, or an adhesive layer. Examples of such known additives include polymers that differ from the binder in terms of chemical composition and properties and do not include any of the other specific functional groups, conductive materials, wetting agents, viscosity modifiers, and additives for electrolyte solution. The content of such additives may, for example, be set as 5 parts by mass or less per 100 parts by mass of the binder, or as 1 part by mass or less per 100 parts by mass of the binder.

Moreover, the presently disclosed binder composition may contain a flame retardant such as a phosphoric compound or a silicone compound from a viewpoint of improving the safety of a secondary battery or other electrochemical device. One of these other components may be used individually, or two or more of these other components may be used in combination.

The content of the aforementioned flame retardant may, for example, be set as 30 parts by mass or less per 100 parts by mass of the binder, or as 15 parts by mass or less per 100 parts by mass of the binder.

<Production Method of Binder Composition>

Although no specific limitations are placed on the method by which the binder composition is produced, the binder composition is normally produced by mixing the binder, the organonitrogen compound, and other components that can be used as necessary in the solvent. The mixing can be performed using a typically used stirrer or disperser without any specific limitations.

(Slurry Composition for Electrochemical Device Functional Layer)

The presently disclosed slurry composition is a composition that is used in formation of a functional layer, that contains the binder composition set forth above, and that optionally further contains functional particles and other components. In other words, the presently disclosed slurry composition normally contains a binder, an organonitrogen compound, and a solvent, and may optionally further contain functional particles and other components. As a result of the presently disclosed slurry composition containing the binder composition set forth above, the presently disclosed slurry composition can, for example, be dried on a substrate so as to obtain a functional layer having excellent adhesiveness. Moreover, by using a device component (battery component, etc.) that includes this functional layer, an electrochemical device (secondary battery, etc.) can be caused to display excellent device characteristics (battery characteristics) and, in particular, excellent rate characteristics and cycle characteristics.

<Binder Composition>

The presently disclosed binder composition set forth above that contains at least the binder and the organonitrogen compound is used as the binder composition.

No specific limitations are placed on the amount of the binder composition in the slurry composition. In a case in which the slurry composition is a slurry composition for an electrode, for example, the amount of the binder composition may be set as an amount such that, in terms of solid content, the amount of the binder is not less than 0.5 parts by mass and not more than 15 parts by mass per 100 parts by mass of electrode active material particles. Moreover, in a case in which the slurry composition is a slurry composition for a porous membrane layer, for example, the amount of the binder composition may be set as an amount such that, in terms of solid content, the amount of the binder is not less than 0.5 parts by mass and not more than 30 parts by mass per 100 parts by mass of non-conductive particles. Furthermore, in a case in which the slurry composition is a slurry composition for an electrochemical device adhesive layer, for example, the amount may be set such that the amount of the binder is not less than 0.5 parts by mass and not more than 50 parts by mass per 100 parts by mass of organic particles.

<Functional Particles>

Examples of functional particles that can be used to cause a functional layer to display a desired function include electrode active material particles in the case of a functional layer that is an electrode mixed material layer and non-conductive particles in the case of a functional layer that is a porous membrane layer.

[Electrode Active Material Particles]

The electrode active material particles are not specifically limited and may be particles formed from a known electrode active material that is used in an electrochemical device such as a secondary battery. Specifically, examples of electrode active material particles that can be used in an electrode mixed material layer of a lithium ion secondary battery, which is one example of an electrochemical device (secondary battery, etc.), include particles formed from the following electrode active materials, but are not specifically limited thereto.

—Positive Electrode Active Material—

Examples of positive electrode active materials that can be used in a positive electrode mixed material layer of a positive electrode in a lithium ion secondary battery include transition metal-containing compounds such as transition metal oxides, transition metal sulfides, and complex metal oxides of lithium and transition metals. Examples of transition metals include Ti, V, Cr, Mn, Fe, Co, Ni, Cu, and Mo.

Specific examples of positive electrode active materials include, but are not specifically limited to, lithium-containing cobalt oxide ($LiCoO_2$), lithium manganate ($LiMn_2O_4$), lithium-containing nickel oxide ($LiNiO_2$), a lithium-containing complex oxide of Co—Ni—Mn, a lithium-containing complex oxide of Ni—Mn—Al, a lithium-containing complex oxide of Ni—Co—Al, olivine-type lithium iron phosphate ($LiFePO_4$), olivine-type manganese lithium phosphate ($LiMnPO_4$), a lithium-rich spinel compound represented by $Li_{1+x}Mn_{2-x}O_4$ (0<x<2), $Li[Ni_{0.17}Li_{0.2}Co_{0.07}Mn_{0.56}]O_2$, and $LiNi_{0.5}Mn_{1.5}O_4$.

One of these positive electrode active materials may be used individually, or two or more of these positive electrode active materials may be used in combination.

—Negative Electrode Active Material—

Examples of negative electrode active materials that can be used in a negative electrode mixed material layer of a negative electrode in a lithium ion secondary battery include carbon-based negative electrode active materials, metal-based negative electrode active materials, and negative electrode active materials that are a combination thereof.

A carbon-based negative electrode active material is an active material having a main framework of carbon into which lithium can be inserted (also referred to as "doping"). Specific examples of carbon-based negative electrode active materials include carbonaceous materials such as coke, mesocarbon microbeads (MCMB), mesophase pitch-based carbon fiber, pyrolytic vapor-grown carbon fiber, pyrolyzed phenolic resin, polyacrylonitrile-based carbon fiber, quasi-isotropic carbon, pyrolyzed furfuryl alcohol resin (PFA), and hard carbon, and graphitic materials such as natural graphite and artificial graphite.

A metal-based negative electrode active material is an active material that contains metal, the structure of which usually contains an element that allows insertion of lithium, and that exhibits a theoretical electric capacity per unit mass of 500 mAh/g or more when lithium is inserted. Examples of metal-based active materials include lithium metal, simple substances of metal that can form a lithium alloy (for example, Ag, Al, Ba, Bi, Cu, Ga, Ge, In, Ni, P, Pb, Sb, Si, Sn, Sr, Zn, and Ti), and oxides, sulfides, nitrides, silicides, carbides, and phosphides thereof. Furthermore, an oxide such as lithium titanate can be used.

One of these negative electrode active materials may be used individually, or two or more of these negative electrode active materials may be used in combination.

[Non-Conductive Particles]

Examples of non-conductive particles that can be used in a porous membrane layer include, but are not specifically limited to, known non-conductive particles that are used in secondary batteries or other electrochemical devices.

Specifically, although both inorganic fine particles and organic fine particles can be used as the non-conductive particles, inorganic fine particles are normally used. The material of the non-conductive particles is preferably an electrochemically stable material that is present stably in the environment of use of an electrochemical device such as a secondary battery. Examples of non-conductive particle materials that are preferable from the viewpoints set forth above include particles of oxides such as aluminum oxide (alumina), hydrous aluminum oxide (boehmite), silicon oxide, magnesium oxide (magnesia), calcium oxide, titanium oxide (titania), $BaTiO_3$, $ZrO$, and alumina-silica complex oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, and/or the like as necessary. In a case in which organic fine particles are used as the non-conductive particles, it is preferable that the organic fine particles have a degree of swelling in electrolyte solution of 1.2 times or less and do not have a melting point or a glass-transition temperature at 250° C. or lower.

One of these types of non-conductive particles may be used individually, or two or more of these types of non-conductive particles may be used in combination.

<Other Components>

Examples of other components that may be contained in the slurry composition include, but are not specifically limited to, the same other components as may be contained in the presently disclosed binder composition. One of such other components may be used individually, or two or more of such other components may be used in combination in a freely selected ratio.

<Production of Slurry Composition>

No specific limitations are placed on the production method of the slurry composition.

In a case in which the slurry composition is a slurry composition for an electrode, for example, the slurry composition can be produced by mixing the binder composition, electrode active material particles, and other components that are used as necessary in the presence of a solvent.

Moreover, in a case in which the slurry composition is a slurry composition for a porous membrane layer, for example, the slurry composition can be produced by mixing the binder composition, non-conductive particles, and other components that are used as necessary in the presence of a solvent.

Furthermore, in a case in which the slurry composition is a slurry composition for an adhesive layer, for example, the binder composition can be used as the slurry composition either as obtained or after dilution with a solvent, or the slurry composition can be produced by mixing the binder composition and other components that are used as necessary in the presence of a solvent.

Note that the solvent used in production of the slurry composition also includes solvent that was contained in the binder composition. The mixing can be performed using a typically used stirrer or disperser without any specific limitations.

<Functional Layer for Electrochemical Device>

The functional layer for an electrochemical device (for example, a functional layer for a non-aqueous secondary battery) is a layer having a function such as reinforcement, adhesion, or giving and receiving electrons inside an electrochemical device (for example, a non-aqueous secondary battery). The functional layer for an electrochemical device may, for example, be an electrode mixed material layer that gives and receives electrons through an electrochemical reaction, a porous membrane layer that improves heat resistance and strength, or an adhesive layer that improves adhesiveness. The functional layer is a layer that is formed from the presently disclosed slurry composition set forth above. For example, the functional layer can be formed by applying the slurry composition set forth above onto the surface of a suitable substrate so as to form a coating film and then drying the coating film that is formed. In other words, the functional layer set forth above is formed by a dried product of the slurry composition set forth above and normally contains at least a binder and an organonitrogen compound. Since components contained in the functional layer are components that were contained in the slurry composition, the preferred ratio of these components is also the same as the preferred ratio thereof in the slurry composition. Moreover, in a case in which the binder is a polymer that includes a cross-linkable functional group (for example, an epoxy group or an oxazoline group), the polymer may be cross-linked during drying of the slurry composition or during heat treatment or the like that is optionally performed after drying (i.e., the functional layer may contain a cross-linked product of the previously described binder).

As a result of the functional layer set forth above being formed from the presently disclosed slurry composition containing the presently disclosed binder composition, the functional layer has excellent adhesiveness, and an electrochemical device such as a secondary battery that includes a device component (battery component) including this functional layer can be caused to display excellent device characteristics (rate characteristics, etc.).

[Substrate]

No limitations are placed on the substrate on which the slurry composition is applied. For example, a coating film of the slurry composition may be formed on the surface of a detachable substrate, the coating film may be dried to form a functional layer, and then the detachable substrate may be peeled from the functional layer. The functional layer that is peeled from the detachable substrate in this manner can be used as a free-standing film in formation of a device component (battery component) of an electrochemical device such as a secondary battery.

However, it is preferable that a current collector, a separator substrate, or an electrode substrate is used as the substrate from a viewpoint of raising battery component production efficiency since a step of peeling the functional layer can be omitted. Specifically, in production of an electrode mixed material layer, it is preferable that the slurry composition is applied onto a current collector serving as a substrate. Moreover, in production of a porous membrane layer or an adhesive layer, it is preferable that the slurry composition is applied onto a separator substrate or an electrode substrate.

—Current Collector—

The current collector is a material having electrical conductivity and electrochemical durability. Specifically, the current collector may be made of, for example, iron, copper, aluminum, nickel, stainless steel, titanium, tantalum, gold, or platinum. Of these materials, copper foil is particularly preferable as a current collector used for a negative electrode. On the other hand, aluminum foil is particularly preferable as a current collector used for a positive electrode. One of these materials may be used individually, or two or more of these materials may be used in combination in a freely selected ratio.

—Separator Substrate—

The separator substrate is not specifically limited and may be a known separator substrate such as an organic separator substrate. The organic separator substrate is a porous member that is made from an organic material. The organic separator substrate may, for example, be a microporous membrane or non-woven fabric containing a polyolefin resin such as polyethylene or polypropylene, or an aromatic polyamide resin, and is preferably a microporous membrane or non-woven fabric made from polyethylene due to the excellent strength thereof.

—Electrode Substrate—

The electrode substrate (positive/negative electrode substrate) is not specifically limited and may be an electrode substrate that is obtained by forming an electrode mixed material layer containing electrode active material particles and a binder on a current collector such as described above.

The electrode active material particles and the binder contained in the electrode mixed material layer of the electrode substrate are not specifically limited and may be the electrode active material particles previously described in the "Slurry composition for electrochemical device functional layer" and the binder previously described in the "Binder composition for electrochemical device" section. The electrode mixed material layer of the electrode substrate may also contain an organonitrogen compound. In other words, the functional layer described above may be used as the electrode mixed material layer of the electrode substrate.

[Formation Method of Functional Layer]

Examples of methods by which the functional layer may be formed on a substrate such as the current collector, the separator substrate, or the electrode substrate described above include:

(1) a method in which the presently disclosed slurry composition is applied onto the surface of the substrate (surface at the electrode mixed material layer-side in the case of an electrode substrate; same applies below) and is then dried;

(2) a method in which the substrate is immersed in the presently disclosed slurry composition and is then dried; and (3) a method in which the presently disclosed slurry composition is applied onto a detachable substrate and is dried to produce a functional layer that is then transferred onto the surface of the substrate.

Of these methods, method (1) is particularly preferable since it allows simple control of the thickness of the functional layer. In more detail, method (1) includes a step of applying the slurry composition onto the substrate (application step) and a step of drying the slurry composition that has been applied onto the substrate to form a functional layer (drying step).

—Application Step—

Examples of methods by which the slurry composition can be applied onto the substrate in the application step include, but are not specifically limited to, doctor blading, reverse roll coating, direct roll coating, gravure coating, extrusion coating, and brush coating.

—Drying Step—

The method by which the slurry composition on the substrate is dried in the drying step is not specifically limited and may be a commonly known method. Examples of drying methods that can be used include drying by warm air, hot air, or low-humidity air, drying in a vacuum, and drying through irradiation with infrared light, an electron beam, or the like. The drying temperature is preferably lower than 200° C., and more preferably lower than 150° C. in order to alleviate concerns about thermal decomposition and sublimation of the organonitrogen compound that is used.

In a case in which an electrode mixed material layer is produced as the functional layer, it is preferable that the electrode mixed material layer is subjected to a pressing process by mold pressing, roll pressing, or the like after the drying step.

<Device Component (Battery Component) Including Functional Layer>

A device component (battery component (separator or electrode)) including the functional layer set forth above may include elements other than the functional layer and the substrate so long as the effects disclosed in the present disclosure are not significantly lost. Examples of such elements include, but are not specifically limited to, an electrode mixed material layer, a porous membrane layer, and an adhesive layer that do not correspond to the functional layer set forth above.

Moreover, the device component (battery component) may include two or more types of the functional layer set forth above. For example, an electrode may include an electrode mixed material layer formed from the presently disclosed slurry composition for an electrode on a current collector and may also include a porous membrane layer and/or adhesive layer formed from the presently disclosed slurry composition for a porous membrane layer and/or slurry composition for an adhesive layer on the electrode mixed material layer. In another example, a separator (composite membrane) may include a porous membrane layer formed from the presently disclosed slurry composition for a porous membrane layer on or in a separator substrate and may also include an adhesive layer formed from the presently disclosed slurry composition for an adhesive layer on the porous membrane layer.

A battery component including the functional layer set forth above has good adhesion with an adjacent battery component and can cause an electrochemical device such as a secondary battery to display excellent device characteristics (for example, rate characteristics).

<Electrochemical Device>

The electrochemical device (secondary battery, etc.) includes the functional layer set forth above. More specifically, the electrochemical device (secondary battery, etc.) includes a positive electrode, a negative electrode, a separator, and an electrolyte solution, wherein the functional layer for an electrochemical device (secondary battery, etc.) set forth above is included by at least one device component (battery component) among the positive electrode, the negative electrode, and the separator. The electrochemical device (secondary battery, etc.) can display excellent device characteristics (for example, rate characteristics).

<Positive Electrode, Negative Electrode, and Separator>

At least one of the positive electrode, the negative electrode, and the separator used in the electrochemical device (secondary battery, etc.) is a device component (battery component) that includes the functional layer set forth above. Note that known positive electrodes, negative electrodes, and separators can be used without any specific limitations for a positive electrode, negative electrode, or separator that does not include the functional layer set forth above.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents in the case of a lithium ion secondary battery, for example, include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having a high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Electrochemical Device>

The electrochemical device (secondary battery, etc.) set forth above can be produced by, for example, stacking the positive electrode and the negative electrode with the separator in-between, performing rolling, folding, or the like of the resultant laminate as necessary to place the laminate in a battery container, injecting the electrolyte solution into the battery container, and sealing the battery container. At least one component among the positive electrode, the negative electrode, and the separator is a device component (battery component) that includes the functional layer set forth above. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may, for example, be a coin type, a button type, a sheet type, a cylinder type, a prismatic type, or a flat type.

(Slurry Composition for Electrochemical Device Adhesive Layer)

The presently disclosed slurry composition for an electrochemical device adhesive layer may contain the presently disclosed binder composition for an electrochemical device and optional organic particles, and does not contain electrode active material particles and non-conductive particles, but may contain other components. Note that the electrode active material particles and non-conductive particles mentioned here are as previously described.

<Organic Particles>

The organic particles are (i) water-insoluble polymer particles formed by a copolymer or (ii) water-insoluble polymer particles having a core/shell structure that may be a partially covered structure. However, the term "organic particles" excludes the binder, non-conductive particles, and electrode active material particles described in the present specification.

The "copolymer" of the "water-insoluble polymer particles formed by a copolymer" may, for example, be an acrylonitrile-butadiene copolymer, a styrene-butadiene copolymer, a (meth)acrylate copolymer, or the like.

The volume-average particle diameter of the organic particles is not specifically limited but is preferably 200 nm or more, more preferably 300 nm or more, and particularly preferably 400 nm or more, and is preferably 1,000 nm or less, more preferably 900 nm or less, and particularly preferably 800 nm or less. Increase of battery resistance can be suppressed when the volume-average particle diameter of the organic particles is not less than any of the lower limits set forth above, whereas adhesiveness with an electrode can be improved when the volume-average particle diameter of the organic particles is not more than any of the upper limits set forth above.

The organic particles preferably have a larger volume-average particle diameter and a higher glass-transition temperature than the binder. As a result of the organic particles having a larger particle diameter and a higher glass-transition temperature than the binder, good adhesiveness with an electrode can be displayed and increase of resistance can be suppressed.

The glass-transition temperature of the organic particles is not specifically limited but is preferably 20° C. or higher, more preferably 30° C. or higher, and particularly preferably 40° C. or higher, and is preferably 90° C. or lower, more preferably 80° C. or lower, and particularly preferably 70° C. or lower. Increase of battery resistance can be suppressed when the glass-transition temperature of the organic particles is not lower than any of the lower limits set forth above, whereas adhesiveness with an electrode can be improved when the glass-transition temperature of the organic particles is not higher than any of the upper limits set forth above.

The degree of swelling in electrolyte solution of the organic particles is not specifically limited but is preferably 20 times or less, more preferably 10 times or less, and particularly preferably 5 times or less. Increase of battery resistance can be suppressed when the degree of swelling in electrolyte solution of the organic particles is not more than any of the upper limits set forth above.

(Slurry Composition for Porous Membrane)

The slurry composition for a porous membrane contains the presently disclosed binder composition for an electrochemical device, optional non-conductive particles, and other components. Note that the non-conductive particles mentioned here are as previously described.

The volume-average particle diameter of the binder and the organonitrogen compound in the slurry composition for a porous membrane is not specifically limited but is preferably 20 nm or more, more preferably 30 nm or more, and particularly preferably 40 nm or more, and is preferably 300 nm or less, more preferably 250 nm or less, and particularly preferably 200 nm or less. Increase of porous membrane air resistance can be suppressed when the volume-average particle diameter of the binder and the organonitrogen compound is not less than any of the lower limits set forth above, whereas good binding capacity can be displayed when the volume-average particle diameter of the binder and the organonitrogen compound is not more than any of the upper limits set forth above.

(Composite Membrane)

The presently disclosed composite membrane is formed through the presently disclosed slurry composition for a porous membrane layer or slurry composition for an adhesive layer (i.e., the presently disclosed slurry composition for a functional layer) being (i) applied, for example, onto a separator substrate (stacked) or (ii) introduced into a separator substrate (internal).

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative examples, the following methods were used to evaluate the adhesiveness (peel strength) of a functional layer and the rate characteristics and cycle characteristics of a secondary battery.

<Adhesiveness (Peel Strength)>

<<Adhesiveness (Peel Strength) of Negative Electrode Mixed Material Layer as Functional Layer>>

A rectangle of 100 mm in length and 10 mm in width was cut out from a produced negative electrode for a lithium ion secondary battery to obtain a test specimen. The test specimen was positioned with a surface at which the negative electrode mixed material layer was located facing downward, and the surface of the negative electrode mixed material layer of the test specimen was affixed to the surface of a test stage (substrate made from SUS) via cellophane tape (tape prescribed by JIS Z1522). Thereafter, the stress (N/m) when one end of the current collector was pulled in a vertical direction at a pulling speed of 50 mm/min to peel off the current collector was measured (note that the cellophane tape was secured to the test stage). This measurement was performed three times. The average value of the measurements was determined as the peel strength and was evaluated by the following standard. A larger value for the peel strength indicates that there is stronger close adhesion between the negative electrode mixed material layer and the current collector, and that the negative electrode mixed material layer has better adhesiveness.

A: Peel strength of 3.5 N/m or more
B: Peel strength of not less than 3.0 N/m and less than 3.5 N/m
C: Peel strength of not less than 2.5 N/m and less than 3.0 N/m
D: Peel strength of not less than 1.5 N/m and less than 2.5 N/m
E: Peel strength of less than 1.5 N/m <<Adhesiveness (Peel Strength) of Positive Electrode Mixed Material Layer as Functional Layer>>

A rectangle of 100 mm in length and 10 mm in width was cut out from a produced positive electrode for a lithium ion secondary battery to obtain a test specimen. The test specimen was positioned with a surface at which the positive electrode mixed material layer was located facing downward, and the surface of the positive electrode mixed material layer of the test specimen was affixed to the surface of a test stage (substrate made from SUS) via cellophane tape (tape prescribed by JIS Z1522). Thereafter, the stress (N/m) when one end of the current collector was pulled in a vertical direction at a pulling speed of 50 mm/min to peel off the current collector was measured (note that the cellophane tape was secured to the test stage). This measurement was performed three times. The average value of the measurements was determined as the peel strength and was evaluated by the following standard. A larger value for the peel strength indicates that there is stronger close adhesion between the positive electrode mixed material layer and the current collector, and that the positive electrode mixed material layer has better adhesiveness.

A: Peel strength of 50.0 N/m or more
B: Peel strength of not less than 40.0 N/m and less than 50.0 N/m
C: Peel strength of not less than 30.0 N/m and less than 40.0 N/m
D: Peel strength of not less than 20.0 N/m and less than 30.0 N/m
E: Peel strength of less than 20.0 N/m <<Adhesiveness (Peel Strength) of Porous Membrane Layer as Functional Layer>>

A rectangle of 100 mm in length and 10 mm in width was cut out from a produced separator including a porous membrane layer to obtain a test specimen. The test specimen was positioned with a surface at which the porous membrane layer was located facing downward, and the surface of the porous membrane layer of the test specimen was affixed to the surface of a test stage (substrate made from SUS) via cellophane tape (tape prescribed by JIS Z1522). Thereafter, the stress (N/m) when one end of the separator substrate was pulled in a vertical direction at a pulling speed of 50 mm/min to peel off the separator substrate was measured (note that the cellophane tape was secured to the test stage). This measurement was performed three times. The average value of the measurements was determined as the peel strength and was evaluated by the following standard. A larger value for the peel strength indicates that there is stronger close adhesion between the porous membrane layer and the separator substrate, and that the porous membrane layer has better adhesiveness.

A: Peel strength of 3.0 N/m or more
B: Peel strength of not less than 2.5 N/m and less than 3.0 N/m
C: Peel strength of not less than 2.0 N/m and less than 2.5 N/m
D: Peel strength of not less than 1.5 N/m and less than 2.0 N/m
E: Peel strength of less than 1.5 N/m <<Adhesiveness (Peel Strength) of Adhesive Layer as Functional Layer>>

A rectangle of 100 mm in length and 10 mm in width was cut out from a produced separator including an adhesive layer to obtain a test specimen. The test specimen was positioned with a surface at which the adhesive layer was located facing downward, and the surface of the adhesive layer of the test specimen was affixed to the surface of a test stage (substrate made from SUS) via cellophane tape (tape prescribed by JIS Z1522). Thereafter, the stress (N/m) when one end of the separator substrate was pulled in a vertical direction at a pulling speed of 50 mm/min to peel off the separator substrate was measured (note that the cellophane tape was secured to the test stage). This measurement was performed three times. The average value of the measurements was determined as the peel strength and was evaluated by the following standard. A larger value for the peel strength indicates that there is stronger close adhesion between the adhesive layer and the separator substrate, and that the adhesive layer has better adhesiveness.

A: Peel strength of 40.0 N/m or more
B: Peel strength of not less than 30.0 N/m and less than 40.0 N/m
C: Peel strength of not less than 20.0 N/m and less than 30.0 N/m
D: Peel strength of not less than 10.0 N/m and less than 20.0 N/m
E: Peel strength of less than 10.0 N/m <<Adhesiveness (Peel Strength) of Composite Membrane>>

A rectangle of 100 mm in length and 10 mm in width was cut out from a produced composite membrane to obtain a test specimen. The test specimen was positioned with a surface at which a functional layer was located facing downward in a case in which the "Functional layer: Location" column in Table 1-4 indicates "Stacked" or with either surface of the composite membrane facing downward in a case in which the "Functional layer: Location" column in Table 1-4 indicates "Internal", and the surface of the functional layer of the test specimen was affixed to the surface of a test stage (substrate made from SUS) via cellophane tape (tape prescribed by JIS Z1522). Thereafter, the stress (N/m) when one end of the separator substrate was pulled in a vertical direction at a pulling speed of 50 mm/min to peel off the separator substrate was measured (note that the cellophane tape was secured to the test stage). This measurement was performed three times. The average value of the measurements was determined as the peel strength and was evaluated by the following standard. A larger value for the peel strength indicates that there is stronger close adhesion between the functional layer and the separator substrate, and that the composite membrane has better adhesiveness.

A: Peel strength of 50.0 N/m or more
B: Peel strength of not less than 40.0 N/m and less than 50.0 N/m
C: Peel strength of not less than 30.0 N/m and less than 40.0 N/m
D: Peel strength of not less than 20.0 N/m and less than 30.0 N/m
E: Peel strength of less than 20.0 N/m <<Adhesiveness (Peel Strength) of Electrode Mixed Material Layer for Electric Double-Layer Capacitor as Functional Layer>>

A rectangle of 100 mm in length and 10 mm in width was cut out from a produced electrode for an electric double-layer capacitor including an electrode mixed material layer to obtain a test specimen. The test specimen was positioned with a surface at which the electrode mixed material layer was located facing downward, and the surface of the electrode mixed material layer was affixed to the surface of a test stage (substrate made from SUS) via cellophane tape (tape prescribed by JIS Z1522). Thereafter, the stress (N/m) when one end of the current collector was pulled in a vertical direction at a pulling speed of 50 mm/min to peel off the current collector was measured (note that the cellophane tape was secured to the test stage). This measurement was performed three times. The average value of the measurements was determined as the peel strength and was evaluated by the following standard. A larger value for the peel strength indicates that there is stronger close adhesion between the electrode mixed material layer and the current collector, and that the electrode mixed material layer has better adhesiveness.

A: Peel strength of 15.0 N/m or more
B: Peel strength of not less than 12.0 N/m and less than 15.0 N/m
C: Peel strength of not less than 9.0 N/m and less than 12.0 N/m
D: Peel strength of not less than 5.0 N/m and less than 9.0 N/m
E: Peel strength of less than 5.0 N/m <<Process Adhesiveness>>

A produced positive electrode and a produced separator (including a functional layer at both sides) were each cut to 50 mm in length and 10 mm in width.

The cut positive electrode and separator were then overlapped and stacked. The resultant laminate was pressed at a pressing speed of 30 m/min using a roll press with a temperature of 70° C. and a load of 10 kN/m to obtain a test specimen.

The test specimen was placed with the surface at the current collector-side of the positive electrode facing downward, and cellophane tape (tape prescribed by JIS Z1522) was affixed to the surface at the current collector-side of the positive electrode. Note that the cellophane tape had been secured to a horizontal test stage in advance. The stress when one end of the separator was pulled vertically upward at a pulling speed of 50 mm/min to peel off the separator was measured. This measurement was made a total of three times.

Separately to the above, a produced negative electrode and a produced separator were each cut to 50 mm in length and 10 mm in width. A test specimen was obtained and stress measurement was performed a total of three times in the same way as when the positive electrode was used.

An average value for the total of six stress values measured using the positive electrode and the negative electrode was determined as second peel strength (N/m), and was evaluated as process adhesiveness of an electrode and a separator via a functional layer by the following standard. A higher second peel strength indicates better process adhesiveness.

A: Second peel strength of 10.0 N/m or more
 B: Second peel strength of not less than 7.0 N/m and less than 10.0 N/m
 C: Second peel strength of not less than 5.0 N/m and less than 7.0 N/m
 D: Second peel strength of not less than 2.0 N/m and less than 5.0 N/m
 E: Second peel strength of less than 2.0 N/m <<Value for Air Resistance Increase>>

A digital Oken type Air-Permeability and Smoothness Tester (EYO-5-1M-R produced by Asahi Seiko Co., Ltd.) was used to measure the Gurley value (s/100 cc-air) of a separator substrate used in production of a separator and of a separator for which a functional layer had been formed. Specifically, the increase in Gurley value $\Delta G$ (=G1−G0) was determined from the Gurley value G0 of the "separator substrate" and the Gurley value G1 of the "separator" for which a functional layer had been formed, and was evaluated by the following standard. A smaller increase in Gurley value $\Delta G$ indicates that the separator has better ion conductivity.

A: Increase in Gurley value of less than 10 s/100 cc-air
 B: Increase in Gurley value of not less than 10 s/100 cc-air and less than 15 s/100 cc-air
 C: Increase in Gurley value of not less than 15 s/100 cc-air and less than 20 s/100 cc-air
 D: Increase in Gurley value of not less than 20 s/100 cc-air and less than 30 s/100 cc-air
 E: Increase in Gurley value of 30 s/100 cc-air or more <Rate Characteristics of Lithium Ion Secondary Battery (LIB) as Electrochemical Device>

A produced lithium ion secondary battery was left for 5 hours at a temperature of 25° C. after being filled with an electrolyte solution. Next, the lithium ion secondary battery was charged to a cell voltage of 3.65 V by a 0.2 C constant-current method at a temperature of 25° C. and was subsequently subjected to 12 hours of aging at a temperature of 60° C. The lithium ion secondary battery was then discharged to a cell voltage of 3.00 V by a 0.2 C constant-current method at a temperature of 25° C. Thereafter, CC-CV charging of the lithium ion secondary battery was performed with a 0.2 C constant current (upper limit cell voltage 4.35 V) and CC discharging of the lithium ion secondary battery was performed to a cell voltage of 3.00 V with a 0.2 C constant current. This charging and discharging at 0.2 C was repeated three times.

Next, 0.2 C constant-current charging and discharging of the lithium ion secondary battery were performed between cell voltages of 4.35 V and 3.00 V in an environment having a temperature of 25° C., and the discharge capacity at that time was defined as C0. Thereafter, the lithium ion secondary battery was CC-CV charged in the same way with a 0.2 C constant current, was discharged to 2.5 V with a 0.5 C constant current in an environment having a temperature of −10° C., and the discharge capacity at that time was defined as C1. A capacity maintenance rate expressed by $\Delta C=(C1/C0)\times100(\%)$ was determined as a rate characteristic and was evaluated by the following standard. A larger value for the capacity maintenance rate $\Delta C$ indicates higher discharge capacity at high current in a low-temperature environment, and lower internal resistance.

A: Capacity maintenance rate $\Delta C$ of 70% or more
 B: Capacity maintenance rate $\Delta C$ of not less than 65% and less than 70%
 C: Capacity maintenance rate $\Delta C$ of not less than 60% and less than 65%
 D: Capacity maintenance rate $\Delta C$ of not less than 55% and less than 60%
 E: Capacity maintenance rate $\Delta C$ of less than 55%

<Rate Characteristics of Electric Double-Layer Capacitor (EDLC) as Electrochemical Device>

A produced electric double-layer capacitor was left for 5 hours at a temperature of 25° C. after being filled with an electrolyte solution. Next, the electric double-layer capacitor was charged to 2.7 V by a 2.0 mA/cm$^2$ constant-current constant-voltage charging method at a temperature of 25° C. The electric double-layer capacitor was subsequently discharged to 0.0 V at 25° C. and 2.0 mA/cm$^2$. This charging and discharging was repeated three times.

Next, the electric double-layer capacitor was subjected to 2.0 mA/cm$^2$ constant-current charging and discharging between cell voltages of 2.7 V and 0.0 V in an environment having a temperature of 25° C., and the discharge capacity at that time was defined as C0. Thereafter, the electric double-layer capacitor was charged in the same way by a 2.0 mA/cm$^2$ constant-current constant-voltage method, was discharged to 0.0 V with a 20.0 mA/cm$^2$ constant current in an environment having a temperature of −10° C., and the discharge capacity at that time was defined as C1. A capacity maintenance rate expressed by $\Delta C=(C1/C0)\times100(\%)$ was determined as a rate characteristic and was evaluated by the following standard. A larger value for the capacity maintenance rate $\Delta C$ indicates higher discharge capacity at high current in a low-temperature environment, and lower internal resistance.

A: Capacity maintenance rate $\Delta C$ of 70% or more
 B: Capacity maintenance rate $\Delta C$ of not less than 65% and less than 70%
 C: Capacity maintenance rate $\Delta C$ of not less than 60% and less than 65%
 D: Capacity maintenance rate $\Delta C$ of not less than 55% and less than 60%
 E: Capacity maintenance rate $\Delta C$ of less than 55%

<Cycle Characteristics of Lithium Ion Secondary Battery (LIB) as Electrochemical Device>

A produced lithium ion secondary battery was left for 24 hours in a 25° C. environment. Thereafter, the lithium ion secondary battery was subjected to a charge/discharge operation at 25° C. of charging to 4.35 V by a constant-voltage constant-current (CC-CV) method with a charge rate of 1 C (cut off condition: 0.02 C) and discharging to 3.0 V by a constant-current (CC) method with a discharge rate of 1 C, and the initial capacity C0 was measured.

The lithium ion secondary battery was also repeatedly subjected to the same charge/discharge operation in a 45° C. environment, and the capacity C1 after 300 cycles was measured. The capacity maintenance rate $\Delta C$ $(=(C1/C0)\times100(\%))$ was calculated and was evaluated by the following standard. A higher capacity maintenance rate indicates a smaller decrease of discharge capacity and better cycle characteristics.

A: Capacity maintenance rate $\Delta C$ of 85% or more
 B: Capacity maintenance rate $\Delta C$ of not less than 80% and less than 85%
 C: Capacity maintenance rate $\Delta C$ of not less than 75% and less than 80%
 D: Capacity maintenance rate $\Delta C$ of not less than 70% and less than 75%
 E: Capacity maintenance rate $\Delta C$ of less than 70%

<Cycle Characteristics of Electric Double-Layer Capacitor (EDLC) as Electrochemical Device>

A produced electric double-layer capacitor was left for 24 hours in a 25° C. environment. Thereafter, the electric double-layer capacitor was subjected to a charge/discharge operation at 25° C. of charging to 2.7 V by a constant-voltage constant-current (CC-CV) method with a charge rate of 20.0 mA/cm$^2$ (cut off condition: 0.2 mA/cm$^2$) and discharging to 0.0 V by a constant-current (CC) method with a discharge rate of 20.0 mA/cm$^2$, and the initial capacity C0 was measured.

The electric double-layer capacitor was also repeatedly subjected to the same charge/discharge operation in a 60° C. environment, and the capacity C1 after 1,000 cycles was measured. The capacity maintenance rate ΔC (=(C1/C0)× 100(%)) was calculated and was evaluated by the following standard. A higher capacity maintenance rate indicates a smaller decrease of discharge capacity and better cycle characteristics.

A: Capacity maintenance rate ΔC of 90% or more
B: Capacity maintenance rate ΔC of not less than 85% and less than 90%
C: Capacity maintenance rate ΔC of not less than 80% and less than 85%
D: Capacity maintenance rate ΔC of not less than 75% and less than 80%
E: Capacity maintenance rate ΔC of less than 75%

Example 1

<Production of Binder (Polymer A)>

A 5 MPa pressure vessel equipped with a stirrer was charged with 61 parts of styrene as an aromatic vinyl monomer, 33 parts of 1,3-butadiene as an aliphatic conjugated diene monomer, 5 parts of itaconic acid as a carboxyl group-containing (carboxy group-containing) monomer, 1 part of 2-hydroxyethyl acrylate as a hydroxyl group-containing monomer, 0.3 parts of t-dodecyl mercaptan as a molecular weight modifier, 5 parts of sodium dodecylbenzenesulfonate as an emulsifier, 150 parts of deionized water as a solvent, and 1 part of potassium persulfate as a polymerization initiator. These materials were sufficiently stirred and were then heated to a temperature of 55° C. to initiate polymerization. The reaction was terminated by cooling at the point at which monomer consumption reached 95.0%. A water dispersion containing a polymer that was obtained in this manner was adjusted to pH 8 through addition of 5% sodium hydroxide aqueous solution. Thereafter, unreacted monomer was removed by thermal-vacuum distillation. Cooling was subsequently performed to a temperature of 30° C. or lower to yield a water dispersion containing a polymer A as a binder.

<Production of Binder Composition for Negative Electrode Mixed Material Layer>

A binder composition was produced by mixing 35 parts of azodicarbonamide (ADCA; 5% mass loss temperature: 200° C.; functional group: azo group; molecular weight: 116; amide group content: 17.2 mmol/g) as an organonitrogen compound relative to 100 parts (in terms of solid content) of the water dispersion of polymer A.

Note that the 5% mass loss temperature of the organonitrogen compound was measured by the following method.
<<5% Mass Loss Temperature of Organonitrogen Compound>>

In thermogravimetric analysis using a thermogravimetric analyzer (TG8110 produced by Rigaku Corporation), the mass of the organonitrogen compound was measured while heating the organonitrogen compound from 25° C. to 500° C. at a heating rate of 10° C./min in a nitrogen atmosphere, and the temperature at which the measured mass was 95% of the mass at the start of measurement (25° C.) was taken to be the 5% mass loss temperature of the organonitrogen compound.

<Production of Slurry Composition for Negative Electrode Mixed Material Layer>

A planetary mixer was charged with 48.75 parts of artificial graphite (theoretical capacity: 360 mAh/g) and 48.75 parts of natural graphite (theoretical capacity: 360 mAh/g) as negative electrode active materials, and 1 part in terms of solid content of carboxymethyl cellulose as a thickener. Deionized water was used to perform dilution to a solid content concentration of 60%, and then kneading was performed for 60 minutes at a rotation speed of 45 rpm. Thereafter, 1.5 parts in terms of solid content of the binder composition for a negative electrode mixed material layer obtained as described above was added and was kneaded therewith for 40 minutes at a rotation speed of 40 rpm. Deionized water was then added to adjust the viscosity to 3,000±500 mPa·s (measured by a B-type viscometer at 25° C. and 60 rpm), and in this manner a slurry composition for a negative electrode mixed material layer was produced.

<Production of Negative Electrode>

The slurry composition for a negative electrode mixed material layer was applied onto the surface of copper foil (current collector) of 15 μm in thickness by a comma coater such as to have a coating weight of 11±0.5 mg/cm'. Thereafter, the copper foil with the slurry composition for a negative electrode mixed material layer applied thereon was conveyed inside an 80° C. oven for 2 minutes and inside a 110° C. oven for 2 minutes at a speed of 500 mm/min so as to dry the slurry composition on the copper foil and thereby obtain a negative electrode web including a negative electrode mixed material layer formed on the current collector.

The negative electrode mixed material layer-side of the produced negative electrode web was subsequently roll pressed with a linear pressure of 11 t (tons) in an environment having a temperature of 25±3° C. so as to obtain a negative electrode having a negative electrode mixed material layer density of 1.60 g/cm$^3$. Thereafter, the negative electrode was left for 1 week in an environment having a temperature of 25±3° C. and a relative humidity of 50±5%. The negative electrode that had been left was used to evaluate adhesiveness (peel strength) of the negative electrode mixed material layer. The results are shown in Table 1-1.

<Production of Positive Electrode>

A slurry composition for a positive electrode mixed material layer was produced by adding 96 parts of an active material based on a lithium complex oxide of Co—Ni—Mn (NMC111; LiNi$_{1/3}$Co$_{1/3}$Mn$_{1/3}$O$_2$; average particle diameter: 10 μm) as a positive electrode active material, 2 parts of acetylene black (produced by Denka Company Limited; product name: HS-100) as a conductive material, and 2 parts of polyvinylidene fluoride (produced by Kureha Corporation; product name: KF-1100) as a binder into a planetary mixer, and further adding and mixing N-methyl-2-pyrrolidone (NMP) as a dispersion medium such that the total solid content concentration was 67%.

The obtained slurry composition for a positive electrode mixed material layer was then applied onto the surface of aluminum foil (current collector) of 20 μm in thickness by a comma coater such as to have a coating weight of 20±0.5 mg/cm$^2$.

The slurry composition on the aluminum foil was dried by conveying the aluminum foil inside a 90° C. oven for 4 minutes and inside a 120° C. oven for 4 minutes at a speed of 300 mm/min so as to obtain a positive electrode web including a positive electrode mixed material layer formed on the current collector.

The positive electrode mixed material layer-side of the produced positive electrode web was subsequently roll pressed with a linear pressure of 14 t (tons) in an environment having a temperature of 25±3° C. so as to obtain a positive electrode having a positive electrode mixed material layer density of 3.40 g/cm³. Thereafter, the positive electrode was left for 1 week in an environment having a temperature of 25±3° C. and a relative humidity of 50±5%.

<Preparation of Separator>

Celgard 2500 made from polypropylene was used as a separator.

<Production of Lithium Ion Secondary Battery (LIB) as Electrochemical Device>

The negative electrode, positive electrode, and separator described above were used to produce a wound cell (discharge capacity: equivalent to 520 mAh) in which the negative electrode mixed material layer and the positive electrode mixed material layer were in opposition via the separator, and this wound cell was positioned inside aluminum packing. The aluminum packing was then filled with LiPF$_6$ solution of 1.0 M in concentration (solvent: mixed solvent of ethylene carbonate (EC)/diethyl carbonate (DEC) =3/7 (volume ratio); additive: containing 2 volume % (solvent ratio) of vinylene carbonate) as an electrolyte solution. The aluminum packing was then closed by heat sealing at a temperature of 150° C. to tightly seal an opening of the aluminum packing, and thereby produce a lithium ion secondary battery. This lithium ion secondary battery was used to evaluate rate characteristics and cycle characteristics. The results are shown in Table 1-1.

Example 2

Polymer A as a binder, a binder composition for a negative electrode mixed material layer, a slurry composition for a negative electrode mixed material layer, a negative electrode, a positive electrode, a separator, and a secondary battery were produced in the same way as in Example 1 with the exception that in production of the binder composition for a negative electrode mixed material layer, the amount of azodicarbonamide was changed to 55 parts (content of azodicarbonamide relative to binder: 55 mass %). Evaluations were also carried out in the same way as in Example 1. The results are shown in Table 1-1.

Example 3

Polymer A as a binder, a binder composition for a negative electrode mixed material layer, a slurry composition for a negative electrode mixed material layer, a negative electrode, a positive electrode, a separator, and a secondary battery were produced in the same way as in Example 1 with the exception that in production of the binder composition for a negative electrode mixed material layer, the amount of azodicarbonamide was changed to 2 parts (content of azodicarbonamide relative to binder: 2 mass %). Evaluations were also carried out in the same way as in Example 1. The results are shown in Table 1-1.

Example 4

Polymer A as a binder, a binder composition for a negative electrode mixed material layer, a slurry composition for a negative electrode mixed material layer, a negative electrode, a positive electrode, a separator, and a secondary battery were produced in the same way as in Example 1 with the exception that in production of the binder composition for a negative electrode mixed material layer, the amount of azodicarbonamide was changed to 100 parts (content of azodicarbonamide relative to binder: 100 mass %). Evaluations were also carried out in the same way as in Example 1. The results are shown in Table 1-1.

Example 5

Polymer A as a binder, a binder composition for a negative electrode mixed material layer, a slurry composition for a negative electrode mixed material layer, a negative electrode, a positive electrode, a separator, and a secondary battery were produced in the same way as in Example 1 with the exception that in production of the binder composition for a negative electrode mixed material layer, p-toluenesulfonyl hydrazide (TSH; 5% mass loss temperature: 140° C.; functional group: hydrazino group; molecular weight: 186; amide group content: 0 mmol/g) was used instead of azodicarbonamide. Evaluations were also carried out in the same way as in Example 1. The results are shown in Table 1-1.

Example 6

Polymer A as a binder, a binder composition for a negative electrode mixed material layer, a slurry composition for a negative electrode mixed material layer, a negative electrode, a positive electrode, a separator, and a secondary battery were produced in the same way as in Example 1 with the exception that in production of the binder composition for a negative electrode mixed material layer, oxybis(benzenesulfonyl hydrazide) (OBSH; 5% mass loss temperature: 160° C.; functional group: hydrazino group; molecular weight: 358; amide group content: 0 mmol/g) was used instead of azodicarbonamide. Evaluations were also carried out in the same way as in Example 1. The results are shown in Table 1-1.

Example 7

Polymer A as a binder, a binder composition for a negative electrode mixed material layer, a slurry composition for a negative electrode mixed material layer, a negative electrode, a positive electrode, a separator, and a secondary battery were produced in the same way as in Example 1 with the exception that in production of the binder composition for a negative electrode mixed material layer, p-toluenesulfonyl semicarbazide (TSSC; 5% mass loss temperature: 230° C.; functional group: hydrazo group; molecular weight: 229; amide group content: 4.4 mmol/g) was used instead of azodicarbonamide. Evaluations were also carried out in the same way as in Example 1. The results are shown in Table 1-1.

Example 8

Polymer A as a binder, a binder composition for a negative electrode mixed material layer, a slurry composition for a negative electrode mixed material layer, a negative electrode, a positive electrode, a separator, and a secondary battery were produced in the same way as in Example 1 with the exception that in production of the binder composition for a negative electrode mixed material layer, 5-methyl-1H- benzotriazole (MBT; 5% mass loss temperature: 315° C.; functional group: azo group; molecular weight: 133; amide group content: 0 mmol/g) was used instead of azodicarbonamide. Evaluations were also carried out in the same way as in Example 1. The results are shown in Table 1-1.

Example 9

A binder composition for a negative electrode mixed material layer, a slurry composition for a negative electrode mixed material layer, a negative electrode, a positive electrode, a separator, and a secondary battery were produced in the same way as in Example 1 with the exception that in production of the binder composition for a negative electrode mixed material layer, a binder (polymer B) produced by the following method was used instead of the binder (polymer A) used in Example 1. Evaluations were also carried out in the same way as in Example 1. The results are shown in Table 1-1.
<Production of Binder (Polymer B)>
A 5 MPa pressure vessel equipped with a stirrer was charged with 64 parts of styrene as an aromatic vinyl monomer, 33 parts of 1,3-butadiene as an aliphatic conjugated diene monomer, 2 parts of itaconic acid as a carboxyl group-containing (carboxy group-containing) monomer, 1 part of 2-hydroxyethyl acrylate as a hydroxyl group-containing monomer, 0.3 parts of t-dodecyl mercaptan as a molecular weight modifier, 5 parts of sodium dodecylbenzenesulfonate as an emulsifier, 150 parts of deionized water as a solvent, and 1 part of potassium persulfate as a polymerization initiator. These materials were sufficiently stirred and were then heated to a temperature of 55° C. to initiate polymerization. The reaction was terminated by cooling at the point at which monomer consumption reached 95.0%. A water dispersion containing a polymer that was obtained in this manner was adjusted to pH 8 through addition of 5% sodium hydroxide aqueous solution. Thereafter, unreacted monomer was removed by thermal-vacuum distillation. Cooling was subsequently performed to a temperature of 30° C. or lower to yield a water dispersion containing a polymer B as a binder.

Example 10

A binder composition for a negative electrode mixed material layer, a slurry composition for a negative electrode mixed material layer, a negative electrode, a positive electrode, a separator, and a secondary battery were produced in the same way as in Example 1 with the exception that in production of the binder composition for a negative electrode mixed material layer, a binder (polymer C) produced by the following method was used instead of the binder (polymer A) used in Example 1. Evaluations were also carried out in the same way as in Example 1. The results are shown in Table 1-1.
<Production of Binder (Polymer C)>
A 5 MPa pressure vessel equipped with a stirrer was charged with 32 parts of styrene as an aromatic vinyl monomer, 33 parts of 1,3-butadiene as an aliphatic conjugated diene monomer, 5 parts of itaconic acid as a carboxyl group-containing (carboxy group-containing) monomer, 1 part of 2-hydroxyethyl acrylate as a hydroxyl group-containing monomer, 29 parts of acrylonitrile as a cyano group-containing (nitrile group-containing) monomer, 0.3 parts of t-dodecyl mercaptan as a molecular weight modifier, 5 parts of sodium dodecylbenzenesulfonate as an emulsifier, 150 parts of deionized water as a solvent, and 1 part of potassium persulfate as a polymerization initiator. These materials were sufficiently stirred and were then heated to a temperature of 55° C. to initiate polymerization. The reaction was terminated by cooling at the point at which monomer consumption reached 95.0%. A water dispersion containing a polymer that was obtained in this manner was adjusted to pH 8 through addition of 5% sodium hydroxide aqueous solution. Thereafter, unreacted monomer was removed by thermal-vacuum distillation. Cooling was subsequently performed to a temperature of 30° C. or lower to yield a water dispersion containing a polymer C as a binder.

Example 11

A binder composition for a negative electrode mixed material layer, a slurry composition for a negative electrode mixed material layer, a negative electrode, a positive electrode, a separator, and a secondary battery were produced in the same way as in Example 1 with the exception that in production of the binder composition for a negative electrode mixed material layer, a binder (polymer D) produced by the following method was used instead of the binder (polymer A) used in Example 1. Evaluations were also carried out in the same way as in Example 1. The results are shown in Table 1-1.
<Production of Binder (Polymer D)>
A 5 MPa pressure vessel equipped with a stirrer was charged with 61 parts of styrene as an aromatic vinyl monomer, 38 parts of 1,3-butadiene as an aliphatic conjugated diene monomer, 1 part of 2-hydroxyethyl acrylate as a hydroxyl group-containing monomer, 0.3 parts of t-dodecyl mercaptan as a molecular weight modifier, 5 parts of sodium dodecylbenzenesulfonate as an emulsifier, 150 parts of deionized water as a solvent, and 1 part of potassium persulfate as a polymerization initiator. These materials were sufficiently stirred and were then heated to a temperature of 55° C. to initiate polymerization. The reaction was terminated by cooling at the point at which monomer consumption reached 95.0%. A water dispersion containing a polymer that was obtained in this manner was adjusted to pH 8 through addition of 5% sodium hydroxide aqueous solution. Thereafter, unreacted monomer was removed by thermal-vacuum distillation. Cooling was subsequently performed to a temperature of 30° C. or lower to yield a water dispersion containing a polymer D as a binder.

Example 12

<Production of Binder (Polymer E)>
A 1 L flask equipped with a septum was charged with 720 g of deionized water. The deionized water was heated to a temperature of 40° C., and the inside of the flask was purged with nitrogen gas at a flow rate of 100 mL/min. Next, 10 g of deionized water, 25 parts of acrylic acid as a carboxyl group-containing (carboxy group-containing) monomer, and 75 parts of acrylamide were mixed and were injected into the flask using a syringe. Thereafter, 8 parts of a 2.5% aqueous solution of potassium persulfate was added into the flask as a polymerization initiator using a syringe. In addition, minutes thereafter, 22 parts of a 2.0% aqueous solution of tetramethylethylenediamine was added as a polymerization promoter using a syringe. After 4 hours, 4 parts of a 2.5% aqueous solution of potassium persulfate was added into the flask as a polymerization initiator, 11 parts of a 2.0% aqueous solution of tetramethylethylenediamine was also added as a polymerization promoter, the temperature was raised to 60° C., and the polymerization reaction was allowed to progress. After 3 hours, the flask was opened to air to terminate the polymerization reaction, and the product was deodorized at a temperature of 80° C. to remove residual monomer. The product was subsequently adjusted to pH 8 using a 10% aqueous solution of lithium hydroxide so as to yield a water dispersion containing a polymer E as a binder.

<Production of Binder Composition for Negative Electrode Mixed Material Layer>

A binder composition was produced by mixing 35 parts of azodicarbonamide (ADCA; 5% mass loss temperature: 200° C.; functional group: azo group; molecular weight: 116) as an organonitrogen compound relative to 100 parts (in terms of solid content) of the water dispersion of polymer E.

<Production of Slurry Composition for Negative Electrode Mixed Material Layer>

A planetary mixer was charged with 48.75 parts of artificial graphite (theoretical capacity: 360 mAh/g) and 48.75 parts of natural graphite (theoretical capacity: 360 mAh/g) as negative electrode active materials, and 2.5 parts in terms of solid content of the binder composition for a negative electrode mixed material layer obtained as described above. Deionized water was used to perform dilution to a solid content concentration of 60%, and then kneading was performed for 60 minutes at a rotation speed of 45 rpm. Deionized water was then added to adjust the viscosity to 3,000±500 mPa·s (measured by a B-type viscometer at 25° C. and 60 rpm), and in this manner a slurry composition for a negative electrode mixed material layer was produced.

<Production of Negative Electrode>

A negative electrode web and a negative electrode were obtained in the same way as in Example 1 with the exception that the slurry composition for a negative electrode mixed material layer described above was used. The obtained negative electrode was used to evaluate adhesiveness (peel strength) of a negative electrode mixed material layer. The results are shown in Table 1-1.

<Production of Positive Electrode, Separator, and Secondary Battery>

A positive electrode, a separator, and a secondary battery were produced in the same way as in Example 1 with the exception that the negative electrode obtained as described above was used. The obtained lithium ion secondary battery was used to evaluate rate characteristics and cycle characteristics. The results are shown in Table 1-1.

Example 13

A binder composition for a negative electrode mixed material layer, a slurry composition for a negative electrode mixed material layer, a negative electrode, a positive electrode, a separator, and a secondary battery were produced in the same way as in Example 12 with the exception that in production of the binder composition for a negative electrode mixed material layer, a binder (polymer F) produced by the following method was used instead of the binder (polymer E) used in Example 12. Evaluations were also carried out in the same way as in Example 12. The results are shown in Table 1-1.

<Production of Binder (Polymer F)>

A 1 L flask equipped with a septum was charged with 720 g of deionized water. The deionized water was heated to a temperature of 40° C., and the inside of the flask was purged with nitrogen gas at a flow rate of 100 mL/min. Next, 10 g of deionized water, 50 parts of acrylic acid as a carboxyl group-containing (carboxy group-containing) monomer, and 50 parts of acrylamide were mixed and were injected into the flask using a syringe. Thereafter, 8 parts of a 2.5% aqueous solution of potassium persulfate was added into the flask as a polymerization initiator using a syringe. In addition, minutes thereafter, 22 parts of a 2.0% aqueous solution of tetramethylethylenediamine was added as a polymerization promoter using a syringe. After 4 hours, 4 parts of a 2.5% aqueous solution of potassium persulfate was added into the flask as a polymerization initiator, 11 parts of a 2.0% aqueous solution of tetramethylethylenediamine was also added as a polymerization promoter, the temperature was raised to 60° C., and the polymerization reaction was allowed to progress. After 3 hours, the flask was opened to air to terminate the polymerization reaction, and the product was deodorized at a temperature of 80° C. to remove residual monomer. The product was subsequently adjusted to pH 8 using a 10% aqueous solution of lithium hydroxide so as to yield a water dispersion containing a polymer F as a binder.

Example 14

A binder composition for a negative electrode mixed material layer, a slurry composition for a negative electrode mixed material layer, a negative electrode, a positive electrode, a separator, and a secondary battery were produced in the same way as in Example 1 with the exception that in production of the binder composition for a negative electrode mixed material layer, a binder (polymer G) produced by the following method was used instead of the binder (polymer A) used in Example 1. Evaluations were also carried out in the same way as in Example 1. The results are shown in Table 1-1.

<Production of Binder (Polymer G)>

A reactor equipped with a stirrer was charged with 70 parts of deionized water, 0.15 parts of sodium lauryl sulfate (produced by Kao Corporation; product name: EMAL 2F) as an emulsifier, and 0.5 parts of ammonium persulfate. The gas phase of the reactor was purged with nitrogen gas and the temperature was raised to 60° C.

A monomer composition was obtained in a separate vessel by mixing 50 parts of deionized water, 0.5 parts of sodium dodecylbenzenesulfonate as an emulsifier, 35 parts of n-butyl acrylate and 45 parts of methyl methacrylate as (meth)acrylic acid ester monomers, 14 parts of acrylonitrile as a cyano group-containing (nitrile group-containing) monomer, 5 parts of methacrylic acid as a carboxyl group-containing (carboxy group-containing) monomer, and 1 part of allyl glycidyl ether as an epoxy group-containing monomer. The monomer composition was continuously added to the reactor over 4 hours to perform polymerization. The reaction was carried out at 60° C. during the addition. Once the addition was completed, stirring was carried out for a further 3 hours at 70° C. to complete the reaction and yield a water dispersion containing a polymer G as a binder.

Example 15

<Production of Binder (Polymer H)>

A reactor A equipped with a mechanical stirrer and a condenser was charged with 85 parts of deionized water and 0.2 parts of sodium linear alkylbenzene sulfonate in a nitrogen atmosphere. These materials were heated to 55° C. under stirring, and 0.3 parts of potassium persulfate was added into the reactor A in the form of a 5.0% aqueous solution. Next, a separate vessel B equipped with a mechanical stirrer was charged with 94 parts of acrylonitrile as a cyano group-containing (nitrile group-containing) monomer, 2 parts of methacrylic acid as a carboxyl group-containing (carboxy group-containing) monomer, 3 parts of dimethylaminoethyl methacrylate as an amino group-containing monomer, 1 part of n-butyl acrylate as a (meth) acrylic acid ester monomer, 0.6 parts of sodium linear alkylbenzene sulfonate, 0.035 parts of t-dodecyl mercaptan, 0.4 parts of polyoxyethylene lauryl ether, and 80 parts of deionized water in a nitrogen atmosphere. These materials were stirred and emulsified to prepare a monomer mixture. The monomer mixture was added into the reactor A at a constant rate over 5 hours while in a stirred and emulsified state. A reaction was carried out until the polymerization conversion rate reached 95% to yield a water dispersion of a copolymer. NMP was then added to the obtained water dispersion of the copolymer so as to adjust the solid content concentration of the copolymer to 7%. Water and excess NMP were removed by vacuum distillation at 90° C. to obtain an NMP solution (solid content concentration: 8%) of a polymer H as a binder.

<Production of Binder Composition for Positive Electrode Mixed Material Layer>

A binder composition was produced by mixing 45 parts of azodicarbonamide (ADCA; 5% mass loss temperature: 200° C.; functional group: azo group; molecular weight: 116) as an organonitrogen compound relative to 100 parts (in terms of solid content) of the NMP solution of polymer H.

<Production of Slurry Composition for Positive Electrode Mixed Material Layer>

Next, 2 parts of acetylene black (produced by Denka Company Limited; product name: HS-100) as a conductive material and 2 parts in terms of solid content of the binder composition for a positive electrode mixed material layer were added relative to 96 parts of an active material based on a lithium complex oxide of Co—Ni—Mn (NMC111; $LiNi_{1/3}Co_{1/3}Mn_{1/3}O_2$; average particle diameter: 10 µm) as a positive electrode active material. These materials were diluted to a solid content concentration of 65% with NMP and were stirred for 1 hour at 3,000 rpm using a disper blade. Deionized water was then added to adjust the viscosity to 3,000±500 mPa·s (measured by a B-type viscometer at 25° C. and 60 rpm), and in this manner a slurry composition for a positive electrode mixed material layer was produced.

<Production of Positive Electrode>

A positive electrode web and a positive electrode were produced in the same way as in Example 1 with the exception that the slurry composition for a positive electrode mixed material layer obtained as described above was used. The obtained positive electrode was used to evaluate adhesiveness (peel strength) of a positive electrode mixed material layer. The results are shown in Table 1-2.

<Production of slurry composition for negative electrode mixed material layer>

A planetary mixer was charged with 48.75 parts of artificial graphite (theoretical capacity: 360 mAh/g) and 48.75 parts of natural graphite (theoretical capacity: 360 mAh/g) as negative electrode active materials, and 1 part in terms of solid content of carboxymethyl cellulose as a thickener. These materials were diluted to a solid content concentration of 60% with deionized water and were subsequently kneaded for 60 minutes at a rotation speed of 45 rpm. Thereafter, 1.5 parts in terms of solid content of polymer A obtained in the same way as in Example 1 was added and was kneaded therewith for 40 minutes at a rotation speed of 40 rpm. Deionized water was then added to adjust the viscosity to 3,000±500 mPa·s (measured by a B-type viscometer at 25° C. and 60 rpm), and in this manner a slurry composition for a negative electrode mixed material layer was produced.

<Production of Negative Electrode>

The slurry composition for a negative electrode mixed material layer was applied onto the surface of copper foil (current collector) of 15 µm in thickness so as to have a coating weight of 11±0.5 mg/cm'. Thereafter, the copper foil with the slurry composition for a negative electrode mixed material layer applied thereon was conveyed inside an 80° C. oven for 2 minutes and inside a 110° C. oven for 2 minutes at a speed of 500 mm/min so as to dry the slurry composition on the copper foil and thereby obtain a negative electrode web including a negative electrode mixed material layer formed on the current collector.

The negative electrode mixed material layer-side of the produced negative electrode web was subsequently roll pressed with a linear pressure of 11 t (tons) in an environment having a temperature of 25±3° C. so as to obtain a negative electrode having a negative electrode mixed material layer density of 1.60 g/cm³. Thereafter, the negative electrode was left for 1 week in an environment having a temperature of 25±3° C. and a relative humidity of 50±5%.

<Production of Separator and Secondary Battery>

A separator was prepared and a secondary battery was produced in the same way as in Example 1 with the exception that the positive electrode and the negative electrode obtained as described above were used. The obtained lithium ion secondary battery was used to evaluate rate characteristics and cycle characteristics. The results are shown in Table 1-2.

Example 16

A binder composition for a positive electrode mixed material layer, a slurry composition for a positive electrode mixed material layer, a positive electrode, a negative electrode, a separator, and a secondary battery were produced in the same way as in Example 15 with the exception that in production of the binder composition for a positive electrode mixed material layer, a binder (polymer I) produced by the following method was used instead of the binder (polymer H) used in Example 15. Evaluations were also carried out in the same way as in Example 15. The results are shown in Table 1-2.

<Production of Binder (Polymer I)>

A reactor A equipped with a mechanical stirrer and a condenser was charged with 85 parts of deionized water and 0.2 parts of sodium linear alkylbenzene sulfonate in a nitrogen atmosphere. These materials were heated to 55° C. under stirring, and 0.3 parts of potassium persulfate was added into the reactor A in the form of a 5.0% aqueous solution. Next, a separate vessel B equipped with a mechanical stirrer was charged with 60 parts of acrylonitrile as a cyano group-containing (nitrile group-containing) monomer, 2 parts of methacrylic acid as a carboxyl group-containing (carboxy group-containing) monomer, 3 parts of dimethylaminoethyl methacrylate as an amino group-containing monomer, 5 parts of n-butyl acrylate and 30 parts of 2-ethylhexyl acrylate as (meth)acrylic acid ester monomers, 0.6 parts of sodium linear alkylbenzene sulfonate, 0.035 parts of t-dodecyl mercaptan, 0.4 parts of polyoxyethylene lauryl ether, and 80 parts of deionized water in a nitrogen atmosphere. These materials were stirred and emulsified to prepare a monomer mixture. The monomer mixture was added into the reactor A at a constant rate over 5 hours while in a stirred and emulsified state. A reaction was carried out until the polymerization conversion rate reached 95% to yield a water dispersion of a copolymer. NMP was then added to the obtained water dispersion of the copolymer so as to adjust the solid content concentration of the copolymer to 7%. Water and excess NMP were removed by vacuum distillation at 90° C. to obtain an NMP solution (solid content concentration: 8%) of a polymer I as a binder.

Example 17

A binder composition for a positive electrode mixed material layer, a slurry composition for a positive electrode mixed material layer, a positive electrode, a negative electrode, a separator, and a secondary battery were produced in the same way as in Example 15 with the exception that in production of the binder composition for a positive electrode mixed material layer, a binder (polymer J) produced by the following method was used instead of the binder (polymer H) used in Example 15. Evaluations were also carried out in the same way as in Example 15. The results are shown in Table 1-2.

<Production of Binder (Polymer J)>

A reactor A equipped with a mechanical stirrer and a condenser was charged with 85 parts of deionized water and 0.2 parts of sodium linear alkylbenzene sulfonate in a nitrogen atmosphere. These materials were heated to 55° C. under stirring, and 0.3 parts of potassium persulfate was added into the reactor A in the form of a 5.0% aqueous solution. Next, a separate vessel B equipped with a mechanical stirrer was charged with 10 parts of acrylonitrile as a cyano group-containing (nitrile group-containing) monomer, 2 parts of methacrylic acid as a carboxyl group-containing (carboxy group-containing) monomer, 3 parts of dimethylaminoethyl methacrylate as an amino group-containing monomer, 5 parts of n-butyl acrylate and 80 parts of 2-ethylhexyl acrylate as (meth)acrylic acid ester monomers, 0.6 parts of sodium linear alkylbenzene sulfonate, 0.035 parts of t-dodecyl mercaptan, 0.4 parts of polyoxyethylene lauryl ether, and 80 parts of deionized water in a nitrogen atmosphere. These materials were stirred and emulsified to prepare a monomer mixture. The monomer mixture was added into the reactor A at a constant rate over 5 hours while in a stirred and emulsified state. A reaction was carried out until the polymerization conversion rate reached 95% to yield a water dispersion of a copolymer. NMP was then added to the obtained water dispersion of the copolymer so as to adjust the solid content concentration of the copolymer to 7%. Water and excess NMP were removed by vacuum distillation at 90° C. to obtain an NMP solution (solid content concentration: 8%) of a polymer J as a binder.

Example 18

A binder composition for a positive electrode mixed material layer, a slurry composition for a positive electrode mixed material layer, a positive electrode, a negative electrode, a separator, and a secondary battery were produced in the same way as in Example 15 with the exception that in production of the binder composition for a positive electrode mixed material layer, a binder (polymer K) produced by the following method was used instead of the binder (polymer H) used in Example 15. Evaluations were also carried out in the same way as in Example 15. The results are shown in Table 1-2.

<Production of Binder (Polymer K)>

A reactor A equipped with a mechanical stirrer and a condenser was charged with 85 parts of deionized water and 0.2 parts of sodium linear alkylbenzene sulfonate in a nitrogen atmosphere. These materials were heated to 55° C. under stirring, and 0.3 parts of potassium persulfate was added into the reactor A in the form of a 5.0% aqueous solution. Next, a separate vessel B equipped with a mechanical stirrer was charged with 80 parts of acrylonitrile as a cyano group-containing (nitrile group-containing) monomer, 2 parts of acrylamido-2-methylpropane sulfonic acid as a sulfo group-containing monomer, 18 parts of n-butyl acrylate as a (meth)acrylic acid ester monomer, 0.6 parts of sodium linear alkylbenzene sulfonate, 0.035 parts of t-dodecyl mercaptan, 0.4 parts of polyoxyethylene lauryl ether, and 80 parts of deionized water in a nitrogen atmosphere. These materials were stirred and emulsified to prepare a monomer mixture. The monomer mixture was added into the reactor A at a constant rate over 5 hours while in a stirred and emulsified state. A reaction was carried out until the polymerization conversion rate reached 95% to yield a water dispersion of a copolymer. NMP was then added to the obtained water dispersion of the copolymer so as to adjust the solid content concentration of the copolymer to 7%. Water and excess NMP were removed by vacuum distillation at 90° C. to obtain an NMP solution (solid content concentration: 8%) of a polymer K as a binder.

Example 19

A binder composition for a positive electrode mixed material layer, a slurry composition for a positive electrode mixed material layer, a positive electrode, a negative electrode, a separator, and a secondary battery were produced in the same way as in Example 15 with the exception that in production of the binder composition for a positive electrode mixed material layer, a binder (polymer L) produced by the following method was used instead of the binder (polymer H) used in Example 15. Evaluations were also carried out in the same way as in Example 15. The results are shown in Table 1-2.

<Production of Binder (Polymer L)>

A separable flask was charged with 150 parts of deionized water and 0.2 parts of sodium dodecylbenzenesulfonate. The inside of the flask was purged with nitrogen gas at a flow rate of 100 mL/min. Meanwhile, 60 parts of deionized water, 0.8 parts in terms of solid content of an ether sulfate emulsifier as an emulsifier, 20 parts of acrylonitrile as a cyano group-containing (nitrile group-containing) monomer, 5 parts of methacrylic acid as a carboxyl group-containing (carboxy group-containing) monomer, 10 parts of methyl methacrylate as a (meth)acrylic acid ester monomer, 40 parts of 2-ethylhexyl acrylate as a (meth)acrylic acid ester monomer, and 25 parts of 2,2,2-trifluoroethyl methacrylate as a (meth)acrylic acid ester monomer were mixed in a separate vessel to prepare a monomer emulsion containing a mixture of the monomers listed above. Thereafter, the flask was heated, and 0.5 parts of ammonium persulfate was added as a polymerization initiator at the point at which the temperature inside the flask reached 60° C. Addition of the prepared monomer emulsion to the flask was started once the internal temperature of the flask reached 70° C. The monomer emulsion was slowly added dropwise over 3 hours while maintaining the internal temperature of the flask at 70° C. The internal temperature of the flask was subsequently raised to 85° C. and the polymerization reaction was allowed to continue. After 3 hours, the flask was opened to air to terminate the polymerization reaction and thereby yield a water dispersion of a copolymer. NMP was then added to the obtained water dispersion of the copolymer so as to adjust the solid content concentration of the copolymer to 7%. Water and excess NMP were removed by vacuum distillation at 90° C. to obtain an NMP solution (solid content concentration: 8%) of a polymer L as a binder.

Example 20

Polymer I as a binder, a binder composition for a positive electrode mixed material layer, a slurry composition for a positive electrode mixed material layer, a positive electrode, a negative electrode, a separator, and a secondary battery were produced in the same way as in Example 16 with the exception that in production of the binder composition for a positive electrode mixed material layer, p,p'-oxybis(benzenesulfonyl semicarbazide) (OBSC; 5% mass loss temperature: 215° C.; functional group: hydrazo group; molecular weight: 444; amide group content: 2.3 mmol/g) was used instead of azodicarbonamide. Evaluations were also carried out in the same way as in Example 16. The results are shown in Table 1-2.

Example 21

<Production of Binder Composition for Porous Membrane Layer>
A binder composition for a porous membrane layer was produced by mixing 45 parts of azodicarbonamide as an organonitrogen compound relative to 100 parts (in terms of solid content) of the water dispersion of polymer G produced in Example 14.

<Production of Slurry Composition for Non-Aqueous Secondary Battery Functional Layer (Porous Membrane Layer)>
A slurry composition for a non-aqueous secondary battery functional layer (porous membrane layer) was obtained by adding deionized water to 100 parts in terms of solid content of alumina (produced by Sumitomo Chemical Co., Ltd.; product name: AKP3000) as non-conductive particles, 5 parts (in terms of solid content) of the binder composition for a porous membrane layer, 1.5 parts of polyacrylamide as a thickener, 0.8 parts of polyacrylic acid as a dispersant, and 0.2 parts of EMULGEN 120 (produced by Kao Corporation) as a wetting agent such that the solid content concentration was 40%, and mixing these materials using a ball mill.

<Production of Separator (Composite Membrane) Including Non-Aqueous Secondary Battery Functional Layer (Porous Membrane Layer) at Both Sides>
The slurry composition for a non-aqueous secondary battery functional layer (porous membrane layer) obtained as described above was applied onto an organic separator substrate (made of polypropylene; product name: Celgard 2500) serving as a substrate such that the coating thickness of the slurry composition for a non-aqueous secondary battery functional layer (porous membrane layer) was 2 μm, and was dried for 10 minutes at 50° C. to obtain a separator (composite membrane) including a functional layer (porous membrane layer) for a non-aqueous secondary battery at one side of the organic separator substrate. The separator (composite membrane) having the functional layer (porous membrane layer) for a non-aqueous secondary battery at one side was used to evaluate adhesiveness (peel strength) of the functional layer (porous membrane layer) for a non-aqueous secondary battery. The results are shown in Table 1-2. A separator (composite membrane) having a functional layer (porous membrane layer) for a non-aqueous secondary battery at both sides of an organic separator substrate was separately obtained by performing the application and drying operations described above with respect to both sides of the organic separator substrate.

<Production of Negative Electrode>
A negative electrode was produced in the same way as in Example 15.

<Production of Positive Electrode>
A positive electrode was produced in the same way as in Example 1.

<Production of Secondary Battery>
The above-described negative electrode, positive electrode, and separator (composite membrane) having a porous membrane layer at both sides were used to produce a wound cell (discharge capacity: equivalent to 520 mAh) in which the negative electrode mixed material layer and the positive electrode mixed material layer were in opposition via the separator, and this wound cell was positioned inside aluminum packing. The wound cell was pressed, together with the aluminum packing, for 8 seconds at a temperature of 70° C. and a pressure of 1.0 MPa using a heating-type flat plate press so as to adhere the separator and the electrodes (negative electrode and positive electrode).

The aluminum packing was then filled with $LiPF_6$ solution of 1.0 M in concentration (solvent: mixed solvent of ethylene carbonate (EC)/diethyl carbonate (DEC)=3/7 (volume ratio); additive: containing 2 volume % (solvent ratio) of vinylene carbonate) as an electrolyte solution. The aluminum packing was then closed by heat sealing at a temperature of 150° C. to tightly seal an opening of the aluminum packing, and thereby produce a lithium ion secondary battery. This lithium ion secondary battery was used to evaluate rate characteristics and cycle characteristics. The results are shown in Table 1-2.

Example 22

A binder composition for a porous membrane layer, a slurry composition for a porous membrane layer, a separator (composite membrane), a negative electrode, a positive electrode, and a secondary battery were produced in the same way as in Example 21 with the exception that in production of the binder composition for a porous membrane layer, dinitrosopentamethylenetetramine (DPT; 5% mass loss temperature: 205° C.; functional group: nitroso group; molecular weight: 184; amide group content: 0 mmol/g) was used instead of azodicarbonamide. Evaluations were also carried out in the same way as in Example 21. The results are shown in Table 1-2.

Example 23

A binder composition for a porous membrane layer, a slurry composition for a porous membrane layer, a separator (composite membrane), a negative electrode, a positive electrode, and a secondary battery were produced in the same way as in Example 21 with the exception that in production of the binder composition for a porous membrane layer, p-toluenesulfonyl hydrazide (TSH; 5% mass loss temperature: 140° C.; functional group: hydrazino group; molecular weight: 186; amide group content: 0 mmol/g) was used instead of azodicarbonamide. Evaluations were also carried out in the same way as in Example 21. The results are shown in Table 1-2.

Example 24

<Production of Binder Composition for Electric Double-Layer Capacitor>
A binder composition was produced by mixing 20 parts of azodicarbonamide as an organonitrogen compound relative to 100 parts (in terms of solid content) of the water dispersion of polymer A produced in Example 1.

<Production of Slurry Composition for Electric Double-Layer Capacitor Electrode>

A planetary mixer was charged with 92 parts of activated carbon (steam-activated carbon obtained using coconut husk as a raw material; YP-50F produced by Kuraray Co., Ltd.; specific surface area: 1,600 $m^2/g$) as an electrode active material, 2 parts of Ketjenblack (ECP produced by Lion Specialty Chemicals Co., Ltd.) as a conductive material, and 3.0 parts in terms of solid content of carboxymethyl cellulose as a thickener, and then these materials were diluted to a solid content concentration of 38% with deionized water. Thereafter, 3.0 parts in terms of solid content of the binder composition for an electric double-layer capacitor obtained as described above was added and was kneaded therewith for 40 minutes at a rotation speed of 40 rpm. Kneading was subsequently performed for 60 minutes at a rotation speed of 40 rpm to obtain a slurry in the form of a paste. Deionized water was then added to adjust the viscosity to 5,000±500 mPa·s (measured by a B-type viscometer at 60 rpm) and thereby produce a slurry composition for an electric double-layer capacitor electrode.

<Production of Electrode for Electric Double-Layer Capacitor>

The slurry composition for an electric double-layer capacitor was applied onto the surface of aluminum foil (current collector) of 20 μm in thickness by a comma coater such as to have a coating weight of 8.0 mg/cm'. Note that this application was performed such that a location at which the slurry composition was not applied remained in order to ensure that there was a section where an electrode mixed material layer was not formed on the aluminum foil after drying. The aluminum foil with the slurry composition for an electric double-layer capacitor electrode applied thereon was conveyed inside an 80° C. oven for 2 minutes and inside a 110° C. oven for 2 minutes at a speed of 0.3 m/min so as to dry the slurry composition on the aluminum foil. The slurry composition was subsequently applied onto the rear side of the aluminum foil and dried in the same way to obtain an electrode web.

The obtained electrode web was pressed to a density of 0.59 $g/cm^3$ by a roll press and was also vacuum dried for 12 hours at a temperature of 150° C. to obtain a double-sided electrode. This double-sided electrode was used to evaluate adhesiveness (peel strength) between an electrode mixed material layer and a current collector. The results are shown in Table 1-2.

<Production of Electric Double-Layer Capacitor>

The double-sided electrode produced as described above was cut out such that a section where an electrode mixed material layer was not formed remained with a size of 2 cm (length)×2 cm (width) and such that a section where an electrode mixed material layer was formed had a size of 5 cm (length)×5 cm (width) (note that this cutting was performed such that the section where an electrode mixed material layer was not formed became an extension of one side of the square shape of the section where an electrode mixed material layer was formed). A separator made of cellulose (TF4035 produced by Nippon Kodoshi Corporation) was cut out as 5.3 cm (length)×5.3 cm (width). Nine electrodes (taken to be four positive electrodes and five negative electrodes) and ten separators that had been cut out in this manner were arranged in the same direction such that sections of the positive electrode current collectors and negative electrode current collectors where an electrode mixed material layer was not formed did not overlap, and these electrodes and separators were all stacked such that positive electrodes and negative electrodes were positioned alternately and such that the separators were positioned between the positive electrodes and the negative electrodes. The four sides of the uppermost and lowermost layers were fastened by tape to obtain a laminate. Note that a separator was positioned at both the uppermost layer and the lowermost layer (outermost layers) in the obtained laminate and that the separators at the uppermost layer and the lowermost layer were each in contact with a negative electrode from the inside of the laminate. Next, tab materials made from aluminum and having a size of 7 cm (length)×1 cm (width)× 0.02 cm (thickness) were ultrasonically welded to sections of the positive/negative electrodes where an electrode mixed material layer was not formed so as to produce an electrode laminate.

The electrode laminate was positioned inside a deep drawn exterior film, three sides were fused, and vacuum impregnation with an electrolyte solution (chemical composition: $(C_2H_5)_4NBF_4$ solution of 1.0 M in concentration (propylene carbonate solvent); produced by Kishida Chemical Co., Ltd.) was performed. The remaining side was subsequently fused under reduced pressure to produce an electric double-layer capacitor. This electric double-layer capacitor was used to evaluate rate characteristics and cycle characteristics. The results are shown in Table 1-2.

Comparative Example 1

A binder composition for a negative electrode mixed material layer, a slurry composition for a negative electrode mixed material layer, a negative electrode, a positive electrode, a separator, and a secondary battery were produced in the same way as in Example 1 with the exception that in production of the binder composition for a negative electrode mixed material layer, the following binder (polymer M) was used instead of the binder (polymer A) used in Example 1. Evaluations were also carried out in the same way as in Example 1. The results are shown in Table 1-2.

<Preparation of Binder (Polymer M)>

Polyvinylidene fluoride (polymer M; produced by Kureha Corporation; product name: KF-1100) as a binder was dissolved in NMP to produce an NMP solution (solid content concentration: 8%) of polymer M as a binder.

Comparative Example 2

Polymer A as a binder, a binder composition for a negative electrode mixed material layer, a slurry composition for a negative electrode mixed material layer, a negative electrode, a positive electrode, a separator, and a secondary battery were produced in the same way as in Example 1 with the exception that in production of the binder composition for a negative electrode mixed material layer, azobisisobutyronitrile (AIBN; 5% mass loss temperature: 108° C.; functional group: azo group; molecular weight: 164; amide group content: 0 mmol/g) was used instead of azodicarbonamide. Evaluations were also carried out in the same way as in Example 1. The results are shown in Table 1-2.

Comparative Example 3

Polymer A as a binder, a binder composition for a negative electrode mixed material layer, a slurry composition for a negative electrode mixed material layer, a negative electrode, a positive electrode, a separator, and a secondary battery were produced in the same way as in Example 1 with the exception that azodicarbonamide was not used as an organonitrogen compound in production of the binder composition for a negative electrode mixed material layer. Evaluations were also carried out in the same way as in Example 1. The results are shown in Table 1-2.

Example 25

<Production of Organic Particles A>

In core portion formation, 37 parts of 2-ethylhexyl acrylate (2EHA) as a (meth)acrylic acid ester monomer, 55 parts of styrene (ST) as an aromatic vinyl monomer, 2.9 parts of methacrylic acid (MAA) as an acid group-containing monomer, 1 part of sodium dodecylbenzenesulfonate as an emulsifier, 150 parts of deionized water, and 0.5 parts of potassium persulfate as a polymerization initiator were added into a 5 MPa pressure vessel equipped with a stirrer, were sufficiently stirred, and were then heated to 60° C. to initiate polymerization. Polymerization was continued until the polymerization conversion rate reached 96% so as to yield a water dispersion containing a particulate polymer X forming a core portion. Next, at the point at which the polymerization conversion rate reached 96%, 5 parts of styrene (ST) as an aromatic vinyl monomer and 0.1 parts of methacrylic acid (MAA) as an acid group-containing monomer were continuously added, the temperature was raised to 70° C., and polymerization was continued for shell portion formation. The reaction was terminated by cooling at the point at which the conversion rate reached 96% to yield a water dispersion containing organic particles A. The obtained organic particles A had a core-shell structure in which the outer surface of a core portion formed from polymer X was partially covered by a shell portion formed from polymer Y.

Results for measurement of the degree of swelling in electrolyte solution, volume-average particle diameter, and glass-transition temperature of the obtained organic particles A are shown in Table 1-3.

—Glass-Transition Temperature (Tg)—

The water dispersion containing the organic particles A was dried for 48 hours at a temperature of 25° C. to obtain a powdered sample as a measurement sample.

A differential scanning calorimetry (DSC) curve was obtained by weighing 10 mg of the measurement sample into an aluminum pan and then measuring the measurement sample under conditions stipulated by JIS Z8703 with a measurement temperature range of −100° C. to 200° C. and a heating rate of 20° C./min, and using a differential scanning calorimeter (EXSTAR DSC6220 produced by SII NanoTechnology Inc.). Note that an empty aluminum pan was used as a reference. The temperature at which the differential signal (DDSC) displayed a peak during this heating was taken to be the glass-transition temperature (° C.). Note that since multiple peaks were measured, the temperature at which a peak with large displacement was displayed was taken to be the glass-transition temperature of the organic particles A.

—Degree of Swelling in Electrolyte Solution of Organic Particles A—

The water dispersion containing the organic particles A was loaded into a petri dish made from polytetrafluoroethylene. The water dispersion in the petri dish was dried for 48 hours at a temperature of 25° C. to obtain a powdered sample. Approximately 0.2 g of this sample was pressed for 2 minutes at a temperature of 200° C. and a pressure of 5 MPa to obtain a test specimen. The measured weight of the obtained test specimen was taken to be W0.

Next, the obtained test specimen was immersed in electrolyte solution having a temperature of 60° C. for 72 hours. The electrolyte solution was a solution containing 1 M in concentration of $LiPF_6$ as a supporting electrolyte in a mixed solvent of ethylene carbonate (EC), diethyl carbonate (DEC), and vinylene carbonate (VC) (volume mixing ratio: EC/DEC/VC=68.5/30/1.5).

After immersion, the test specimen was removed from the electrolyte solution, and electrolyte solution on the surface of the test specimen was wiped off. The measured weight of the test specimen after immersion was taken to be W1. The measured weights W0 and W1 were used to calculate the degree of swelling in electrolyte solution S (mass %) as S=(W1/W0)×100.

—Volume-Average Particle Diameter—

The volume-average particle diameter of the organic particles A was measured by laser diffraction. Specifically, the prepared water dispersion containing the organic particles A (adjusted to a solid content concentration of 0.1 mass %) was used as a sample. The particle diameter D50 at which, in a particle diameter distribution (volume basis) measured using a laser diffraction particle diameter distribution analyzer (produced by Beckman Coulter, Inc.; product name: LS-13 320), cumulative volume calculated from a small diameter end of the distribution reached 50% was taken to be the volume-average particle diameter.

<Production of Slurry Composition for Non-Aqueous Secondary Battery Functional Layer (Adhesive Layer)>

A mixture was obtained by mixing 45 parts of azodicarbonamide (ADCA; 5% mass loss temperature: 200° C.; functional group: azo group; molecular weight: 116; amide group content: 17.2 mmol/g) as an organonitrogen compound, 1,000 parts in terms of solid content of the organic particles A, and 1 part of EMULGEN 120 (produced by Kao Corporation) as a wetting agent relative to 55 parts (in terms of solid content) of a water dispersion of polymer G as a binder in a stirring vessel.

The obtained mixture was diluted with deionized water to obtain a slurry composition for a non-aqueous secondary battery functional layer (adhesive layer) in the form of a slurry (solid content concentration: 10%).

The particle diameter and Tg of the polymer G were measured by the same methods as the particle diameter and Tg of the organic particles A.

<Production of Separator (Composite Membrane) Including Non-Aqueous Secondary Battery Functional Layer (Adhesive Layer) at Both Sides>

A separator substrate made from polypropylene (produced by Celgard, LLC.; product name: Celgard 2500; thickness: 25 μm) was prepared. The slurry composition for a non-aqueous secondary battery functional layer (adhesive layer) obtained as described above was applied onto the surface of the prepared separator substrate and was dried for 3 minutes at a temperature of 50° C. The same operations were performed with respect to the other side of the separator so as to obtain a separator including a functional layer (adhesive layer) for a non-aqueous secondary battery at both sides (thickness of each functional layer (adhesive layer): 1 μm).

The peel strength of the obtained functional layer (adhesive layer) for a non-aqueous secondary battery and the process adhesiveness of the obtained separator (composite membrane) were evaluated. The results are shown in Table 1-3. Note that negative and positive electrodes produced as described below were used in evaluation of process adhesiveness.

<Production of Negative Electrode>

A 5 MPa pressure vessel equipped with a stirrer was charged with 33 parts of 1,3-butadiene as an aliphatic conjugated diene monomer, 3.5 parts of itaconic acid as a carboxy group-containing monomer, 63.5 parts of styrene as an aromatic vinyl monomer, 0.4 parts of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. The polymerization reaction was terminated by cooling at the point at which the polymerization conversion rate reached 96% to yield a mixture containing a particulate binder (styrene-butadiene copolymer). The mixture was adjusted to pH 8 through addition of 5% sodium hydroxide aqueous solution, and was then subjected to thermal-vacuum distillation to remove unreacted monomer. Thereafter, the mixture was cooled to 30° C. or lower to obtain a water dispersion containing a binder for a negative electrode.

A mixture containing 100 parts of artificial graphite (average particle diameter: 15.6 µm) and 1 part in terms of solid content of a 2% aqueous solution of a sodium salt of carboxymethyl cellulose (produced by Nippon Paper Industries Co., Ltd.; product name: MAC350HC) as a thickener was adjusted to a solid content concentration of 68% with deionized water and was then mixed for 60 minutes at 25° C. Next, the mixture was adjusted to a solid content concentration of 62% with deionized water and was then further mixed for 15 minutes at 25° C. to yield a mixed liquid. Deionized water and 1.5 parts in terms of solid content of the water dispersion containing the above-described binder for a negative electrode were added to the obtained mixed liquid, the final solid content concentration was adjusted to 52%, and a further 10 minutes of mixing was performed. The resultant mixed liquid was subjected to a defoaming process under reduced pressure to yield a slurry composition for a negative electrode having good fluidity.

The slurry composition for a non-aqueous secondary battery negative electrode obtained as described above was applied onto copper foil (thickness: 20 µm) used as a current collector by a comma coater such as to have a thickness of approximately 150 µm after drying. The slurry composition was dried by conveying the copper foil onto which it had been applied inside a 60° C. oven for 2 minutes at a speed of 0.5 m/min. Thereafter, heat treatment was performed for 2 minutes at 120° C. to obtain a pre-pressing negative electrode web. The pre-pressing negative electrode web was rolled by roll pressing to obtain a post-pressing negative electrode (negative electrode mixed material layer thickness: 80 µm).

A single-sided negative electrode having the slurry composition applied at one side thereof and a double-sided negative electrode having the slurry composition applied at both sides thereof were produced. The single-sided negative electrode was used to evaluate process adhesiveness and the double-sided negative electrode was used in production of a non-aqueous secondary battery described below.

<Formation of Positive Electrode>

N-methylpyrrolidone as a solvent was mixed with 100 parts of $LiCoO_2$ (volume-average particle diameter: 12 µm) as a positive electrode active material, 2 parts of acetylene black (produced by Denka Company Limited; product name: HS-100) as a conductive material, and 2 parts in terms of solid content of polyvinylidene fluoride (produced by Kureha Corporation; product name: #7208) as a binder for a positive electrode so as to obtain a mixed liquid adjusted to a total solid content concentration of 70%. Mixing of the obtained mixed liquid was performed using a planetary mixer to obtain a slurry composition for a non-aqueous secondary battery positive electrode.

The slurry composition for a non-aqueous secondary battery positive electrode obtained as described above was applied onto aluminum foil (thickness: 20 µm) used as a current collector by a comma coater such as to have a thickness of approximately 150 µm after drying. The slurry composition was dried by conveying the aluminum foil inside a 60° C. oven for 2 minutes at a speed of 0.5 m/min. Thereafter, heat treatment was performed for 2 minutes at 120° C. to obtain a pre-pressing positive electrode web. The pre-pressing positive electrode web was rolled by roll pressing to obtain a post-pressing positive electrode (positive electrode mixed material layer thickness: 80 µm).

A single-sided positive electrode having the slurry composition applied at one side thereof and a double-sided positive electrode having the slurry composition applied at both sides thereof were produced. The single-sided positive electrode was used to evaluate process adhesiveness and the double-sided positive electrode was used in production of a non-aqueous secondary battery described below.

<Production of Lithium Ion Secondary Battery (LIB) as Electrochemical Device>

The post-pressing, double-sided positive electrode obtained as described above was cut out as 10 positive electrodes of 5 cm×5 cm in size, the separator (composite membrane) having a functional layer (adhesive layer) at both sides that was obtained as described above was cut out as 20 separators of 5.5 cm×5.5 cm in size, and the post-pressing, double-sided negative electrode produced as described above was cut out as 11 negative electrodes of 5.2 cm×5.2 cm in size. These components were stacked in a "negative electrode/separator/positive electrode" order and were pressed for 5 seconds at 90° C. and 2 MPa to obtain a preliminary laminate. Ten preliminary laminates obtained in this manner were further stacked in a "preliminary laminate/separator/preliminary laminate" order and were subsequently pressed for 5 seconds at 90° C. and 2 MPa to obtain a laminate (preliminary laminate 1/separator/preliminary laminate 2/separator/preliminary laminate 3/separator/preliminary laminate 4/separator/preliminary laminate 5/separator/preliminary laminate 6/separator/preliminary laminate 7/separator/preliminary laminate 8/separator/preliminary laminate 9/separator/preliminary laminate 10).

Next, the laminate was enclosed in an aluminum packing case serving as a battery case. Electrolyte solution was injected into the aluminum packing case such that no air remained. The electrolyte solution was a solution containing 1 M in concentration of $LiPF_6$ as a supporting electrolyte in a mixed solvent of ethylene carbonate (EC), diethyl carbonate (DEC), and vinylene carbonate (VC) (volume mixing ratio: EC/DEC/VC=68.5/30/1.5). An opening of the aluminum packing case was heat sealed at 150° C. to tightly close the aluminum packing case and thereby produce a wound lithium ion secondary battery having a capacity of 800 mAh. The rate characteristics (low-temperature output characteristics) and cycle characteristics of the wound lithium ion secondary battery that was obtained were evaluated. The results are shown in Table 1-3. Good operation of the produced lithium ion secondary battery was confirmed.

Example 26

A slurry composition for a non-aqueous secondary battery functional layer (adhesive layer), a separator (composite membrane), a negative electrode, a positive electrode, and a secondary battery were produced in the same way as in Example 25 with the exception that in production of the slurry composition for a non-aqueous secondary battery functional layer (adhesive layer), dinitrosopentamethylenetetramine (DPT; 5% mass loss temperature: 205° C.; functional group: nitroso group; molecular weight: 184; amide content: 0 mmol/g) was used instead of azodicarbonamide (ADCA) as an organonitrogen compound, and organic particles B produced as described below were used instead of organic particles A. Evaluations were also carried out in the same way as in Example 25. The results are shown in Table 1-3.

<<Production of Organic Particles B>>

In core portion formation, 23 parts of 2-ethylhexyl acrylate (2EHA) as a (meth)acrylic acid ester monomer, 36.3 parts of styrene (ST) as an aromatic vinyl monomer, 2 parts of methacrylic acid (MAA) as an acid group-containing monomer, 8.5 parts of acrylonitrile (AN) as a cyano group-containing monomer, 0.2 parts of ethylene glycol dimethacrylate (EDMA) as a cross-linkable monomer, 1 part of sodium dodecylbenzenesulfonate as an emulsifier, 150 parts of deionized water, and 0.5 parts of potassium persulfate as a polymerization initiator were added into a 5 MPa pressure vessel equipped with a stirrer, were sufficiently stirred, and were then heated to 60° C. to initiate polymerization. Polymerization was continued until the polymerization conversion rate reached 96% so as to yield a water dispersion containing a particulate polymer X forming a core portion. Next, at the point at which the polymerization conversion rate reached 96%, 29.5 parts of styrene (ST) as an aromatic vinyl monomer and 0.5 parts of methacrylic acid (MAA) as an acid group-containing monomer were continuously added, the temperature was raised to 70° C., and polymerization was continued for shell portion formation. The reaction was terminated by cooling at the point at which the conversion rate reached 96% to yield a water dispersion containing organic particles B. The obtained organic particles B had a core-shell structure in which the outer surface of a core portion formed from polymer X was partially covered by a shell portion formed from polymer Y.

Results for the degree of swelling in electrolyte solution, volume-average particle diameter, and glass-transition temperature of the obtained organic particles B, measured in the same way as for the organic particles A, are shown in Table 1-3.

Example 27

A slurry composition for a non-aqueous secondary battery functional layer (adhesive layer), a separator (composite membrane), a negative electrode, a positive electrode, and a secondary battery were produced in the same way as in Example 25 with the exception that in production of the slurry composition for a non-aqueous secondary battery functional layer (adhesive layer), p-toluenesulfonyl hydrazide (TSH; 5% mass loss temperature: 140° C.; functional group: hydrazino group; molecular weight: 186; amide group content: 0 mmol/g) was used instead of azodicarbonamide (ADCA) as an organonitrogen compound, and organic particles C produced as described below were used instead of organic particles A. Evaluations were also carried out in the same way as in Example 25. The results are shown in Table 1-3.

<<Production of organic particles C>>

In core portion formation, 38.5 parts of methyl methacrylate (MMA), 28.6 parts of butyl acrylate (BA), and 0.1 parts of allyl methacrylate (AMA) as (meth)acrylic acid ester monomers, 2.8 parts of methacrylic acid (MAA) as an acid group-containing monomer, 1 part of sodium dodecylbenzenesulfonate as an emulsifier, 150 parts of deionized water, and 0.5 parts of potassium persulfate as a polymerization initiator were added into a 5 MPa pressure vessel equipped with a stirrer, were sufficiently stirred, and were then heated to 60° C. to initiate polymerization. Polymerization was continued until the polymerization conversion rate reached 96% so as to yield a water dispersion containing a particulate polymer X forming a core portion. Next, at the point at which the polymerization conversion rate reached 96%, 29.5 parts of styrene (ST) as an aromatic vinyl monomer and 0.5 parts of methacrylic acid (MAA) as an acid group-containing monomer were continuously added, the temperature was raised to 70° C., and polymerization was continued for shell portion formation. The reaction was terminated by cooling at the point at which the conversion rate reached 96% to yield a water dispersion containing organic particles C. The obtained organic particles C had a core-shell structure in which the outer surface of a core portion formed from polymer X was partially covered by a shell portion formed from polymer Y.

Results for the degree of swelling in electrolyte solution, volume-average particle diameter, and glass-transition temperature of the obtained organic particles C, measured in the same way as for the organic particles A, are shown in Table 1-3.

Comparative Example 4

A slurry composition for a non-aqueous secondary battery functional layer (adhesive layer), a separator (composite membrane), a negative electrode, a positive electrode, and a secondary battery were produced in the same way as in Example 25 with the exception that azodicarbonamide (ADCA) was not used as an organonitrogen compound in production of the slurry composition for a non-aqueous secondary battery functional layer (adhesive layer). Evaluations were also carried out in the same way as in Example 25. The results are shown in Table 1-3.

Comparative Example 5

A slurry composition for a non-aqueous secondary battery functional layer (adhesive layer), a separator (composite membrane), a negative electrode, a positive electrode, and a secondary battery were produced in the same way as in Example 26 with the exception that dinitrosopentamethylenetetramine (DPT) was not used as an organonitrogen compound in production of the slurry composition for a non-aqueous secondary battery functional layer (adhesive layer). Evaluations were also carried out in the same way as in Example 26. The results are shown in Table 1-3.

Comparative Example 6

A slurry composition for a non-aqueous secondary battery functional layer (adhesive layer), a separator (composite membrane), a negative electrode, a positive electrode, and a secondary battery were produced in the same way as in Example 27 with the exception that p-toluenesulfonyl hydrazide (TSH) was not used as an organonitrogen compound in production of the slurry composition for a non-aqueous secondary battery functional layer (adhesive layer).

Evaluations were also carried out in the same way as in Example 27. The results are shown in Table 1-3.

Example 28

<Production of Slurry Composition for Separator (Composite Membrane) Including Functional Layer (Adhesive Layer) for Non-Aqueous Secondary Battery>

A Three-One Motor was used to stir 60 parts of polymer G (particle diameter: 190 nm) as a binder, 40 parts of azodicarbonamide (ADCA 1; 5% mass loss temperature: 200° C.; functional group: azo group; molecular weight: 116; amide group content: 17.2 mmol/g; particle diameter: 190 nm) as an organonitrogen compound, 5 parts of EMULGEN 120 (produced by Kao Corporation) as a wetting agent, and 600 parts of deionized water as a liquid medium for 30 minutes to produce a total amount of 500 g of a slurry composition for a separator (composite membrane).

Note that the particle diameters of polymer G and ADCA 1 were measured by the same method as the particle diameter of the previously described organic particles A.

<Production of Separator (Composite Membrane) Including Functional Layer (Adhesive Layer) for Non-Aqueous Secondary Battery>

A separator substrate made from polypropylene (produced by Celgard, LLC.; product name: Celgard 2500; thickness: 25 μm) was prepared. The slurry composition for a separator (composite membrane) obtained as described above was applied onto the surface of the prepared separator substrate and was dried for 3 minutes at a temperature of 50° C. to obtain a separator including a functional layer (adhesive layer) at one side (functional layer thickness: 2 μm).

The adhesiveness (peel strength) and value for air resistance increase of the obtained separator (composite membrane) were evaluated. Note that impregnation to an inner part means that the composition for a composite membrane is present up to an inner part of the separator substrate in a thickness direction thereof and can be confirmed by, for example, cutting the separator in the thickness direction and then observing the separator using an electron microscope. In a case in which a characteristic element or a characteristic structure is present in the composition for a composite membrane, the presence of the composition can be confirmed by glow discharge optical emission spectroscopy, EPMA through Os staining, or the like. Therefore, the obtained separator was sectioned using a cross section polisher (produced by JEOL Ltd.) and the resultant cross section was observed by an FE-SEM (S4700 produced by Hitachi High-Technologies Corporation) to confirm whether a functional layer was stacked on the separator substrate or was impregnated in an inner part of the separator substrate. The results are shown in Table 1-4.

<Production of Positive Electrode>

A slurry composition for a positive electrode was obtained by combining 100 parts of $LiCoO_2$ (volume-average particle diameter (D50): 12 μm) as a positive electrode active material, 2 parts of acetylene black (HS-100 produced by Denka Company Limited) as a conductive material, 2 parts in terms of solid content of PVDF (polyvinylidene fluoride; #7208 produced by Kureha Corporation) as a binder for a positive electrode mixed material layer, and an amount of NMP (N-methylpyrrolidone) such that the total solid content concentration was 70%, and mixing these materials using a planetary mixer.

The obtained slurry composition for a positive electrode was applied onto aluminum foil (current collector) of 20 μm in thickness by a comma coater such as to have a thickness of approximately 150 μm after drying. The slurry composition was dried by conveying the aluminum foil inside a 60° C. oven for 2 minutes at a speed of 0.5 m/min. Thereafter, the positive electrode web was rolled by roll pressing to obtain a positive electrode having a positive electrode mixed material layer thickness of 95 μm.

<Production of Negative Electrode>

A 5 MPa pressure vessel equipped with a stirrer was charged with 33.5 parts of 1,3-butadiene, 3.5 parts of itaconic acid, 62 parts of styrene, 1 part of 2-hydroxyethyl acrylate, 0.4 parts of sodium dodecylbenzenesulfonate as an emulsifier, 150 parts of deionized water, and 0.5 parts of potassium peroxodisulfate as a polymerization initiator. These materials were sufficiently stirred and were then heated to 50° C. to initiate polymerization. The reaction was terminated by cooling at the point at which the polymerization conversion rate reached 96% to yield a mixture containing a binder (SBR) for a negative electrode mixed material layer. The mixture containing the binder for a negative electrode mixed material layer was adjusted to pH 8 through addition of 5% sodium hydroxide aqueous solution, and was then subjected to thermal-vacuum distillation to remove unreacted monomer. Thereafter, the mixture was cooled to 30° C. or lower to obtain a water dispersion containing the target binder for a negative electrode mixed material layer.

A mixture of 100 parts of artificial graphite (volume-average particle diameter (D50): 15.6 μm) as a negative electrode active material and 1 part in terms of solid content of a 2% aqueous solution of a sodium salt of carboxymethyl cellulose (MAC350HC produced by Nippon Paper Industries Co., Ltd.) as a thickener was adjusted to a solid content concentration of 68% with deionized water and was then mixed for 60 minutes at 25° C. The solid content concentration was then adjusted to 62% with deionized water and a further 15 minutes of mixing was carried out at 25° C. Deionized water and 1.5 parts in terms of solid content of the binder (SBR) for a negative electrode mixed material layer were added, the final solid content concentration was adjusted to 52%, and a further 10 minutes of mixing was carried out. The resultant mixture was subjected to a defoaming process under reduced pressure to yield a slurry composition for a negative electrode having good fluidity.

The obtained slurry composition for a negative electrode was applied onto copper foil (current collector) of 20 μm in thickness by a comma coater such as to have a thickness of approximately 150 μm after drying. The slurry composition was dried by conveying the copper foil inside a 60° C. oven for 2 minutes at a speed of 0.5 m/min. Thereafter, the negative electrode web was rolled by roll pressing to obtain a negative electrode having a negative electrode active material layer thickness of 100 μm.

<Production of Lithium Ion Secondary Battery>

An aluminum packing case was prepared as a battery case. The produced positive electrode was cut out as a 4.6 cm×4.6 cm square to obtain a square positive electrode. In addition, the produced separator (composite membrane) was cut out as a 5.2 cm×5.2 cm square to obtain a square separator (composite membrane). The produced negative electrode was also cut out as a 5 cm×5 cm square to obtain a square negative electrode. The square positive electrode was positioned inside the aluminum packing case such that a surface at the current collector-side of the positive electrode was in contact with the packing case. The square separator (composite membrane) was positioned on a surface at the positive electrode mixed material layer-side of the square positive electrode such as to be in contact with the square positive electrode. The square negative electrode was positioned on the separator (composite membrane) such that a surface at the negative electrode mixed material layer-side of the negative electrode faced the separator (composite membrane). Next, electrolyte solution (solvent (volume ratio): ethylene carbonate (EC)/ethyl methyl carbonate (EMC)/vinylene carbonate (VC)=68.5/30/1.5; electrolyte: $LiPF_6$ of 1 M in concentration) was injected such that no air remained. In addition, heat sealing was performed at 150° C. to close the aluminum packing case and thereby produce a lithium ion secondary battery.

The rate characteristics and cycle characteristics of this lithium ion secondary battery were evaluated. The results are shown in Table 1-4.

Example 29

A slurry composition for a separator (composite membrane), a separator (composite membrane), a negative electrode, a positive electrode, and a secondary battery were produced in the same way as in Example 28 with the exception that in production of the slurry composition for a separator (composite membrane), "40 parts of azodicarbonamide (ADCA 1) as an organonitrogen compound" was changed to "10 parts of azodicarbonamide (ADCA 1) as an organonitrogen compound and 30 parts (in terms of solid content) of alumina (produced by Sumitomo Chemical Co., Ltd.; product name: AKP30; particle diameter: 300 nm) as non-conductive particles". Evaluations were also carried out in the same way as in Example 28. The results are shown in Table 1-4. Note that the particle diameter of the non-conductive particles was measured by the same method as the particle diameter of the previously described organic particles A.

Example 30

A slurry composition for a separator (composite membrane), a negative electrode, a positive electrode, and a secondary battery were produced in the same way as in Example 28 with the exception that in production of the slurry composition for a separator (composite membrane), "40 parts of azodicarbonamide (ADCA 1) as an organonitrogen compound" was changed to "40 parts of azodicarbonamide (ADCA 2; 5% mass loss temperature: 200° C.; functional group: azo group; molecular weight: 116; amide group content: 17.2 mmol/g; particle diameter: 50 nm) as an organonitrogen compound" and "polymer G (particle diameter: 190 nm) as a binder" was changed to "polymer G (particle diameter: 50 nm) as a binder", and "production of a separator (composite membrane)" was carried out as described below. Evaluations were also carried out in the same way as in Example 28. The results are shown in Table 1-4.

<Production of Separator (Composite Membrane)>

A separator substrate made from polyethylene (thickness: 12 μm; air resistance: 100 s/100 cc-air) was immersed in the produced slurry composition for a separator (composite membrane) for 2 minutes. The separator substrate was subsequently removed from the slurry composition for a separator (composite membrane) and excess slurry composition on the surface was scraped off. Drying was then performed for 1 minute in a 50° C. oven to produce a separator (composite membrane).

Example 31

A slurry composition for a separator (composite membrane), a separator (composite membrane), a negative electrode, a positive electrode, and a secondary battery were produced in the same way as in Example 28 with the exception that in production of the slurry composition for a separator (composite membrane), "40 parts of azodicarbonamide (ADCA 1) as an organonitrogen compound" was changed to "40 parts of azodicarbonamide (ADCA 2; 5% mass loss temperature: 200° C.; functional group: azo group; molecular weight: 116; amide group content: 17.2 mmol/g; particle diameter: 50 nm) as an organonitrogen compound", and "polymer G (particle diameter: 190 nm) as a binder" was changed to "polymer G (particle diameter: 50 nm) as a binder". Evaluations were also carried out in the same way as in Example 28. The results are shown in Table 1-4.

Example 32

A slurry composition for a separator (composite membrane), a separator (composite membrane), a negative electrode, a positive electrode, and a secondary battery were produced in the same way as in Example 30 with the exception that in production of the slurry composition for a separator (composite membrane), "40 parts of azodicarbonamide (ADCA 2) as an organonitrogen compound" was changed to "10 parts of azodicarbonamide (ADCA 2) as an organonitrogen compound and 30 parts (in terms of solid content) of alumina (produced by Nippon Aerosil Co., Ltd.; product name: AEROXIDE Alu 65; particle diameter: 25 nm) as non-conductive particles". Evaluations were also carried out in the same way as in Example 30. The results are shown in Table 1-4.

Example 33

A slurry composition for a separator (composite membrane), a separator (composite membrane), a negative electrode, a positive electrode, and a secondary battery were produced in the same way as in Example 28 with the exception that in production of the slurry composition for a separator (composite membrane), "40 parts of azodicarbonamide (ADCA 1) as an organonitrogen compound" was changed to "40 parts of dinitrosopentamethylenetetramine (DPT 1; 5% mass loss temperature: 205° C.; functional group: nitroso group; molecular weight: 184; amide group content: 0 mmol/g; particle diameter: 190 nm) as an organonitrogen compound". Evaluations were also carried out in the same way as in Example 28. The results are shown in Table 1-4.

Example 34

A slurry composition for a separator (composite membrane), a separator (composite membrane), a negative electrode, a positive electrode, and a secondary battery were produced in the same way as in Example 30 with the exception that in production of the slurry composition for a separator (composite membrane), "40 parts of azodicarbonamide (ADCA 2) as an organonitrogen compound" was changed to "40 parts of dinitrosopentamethylenetetramine (DPT 2; 5% mass loss temperature: 205° C.; functional group: nitroso group; molecular weight: 184; amide group content: 0 mmol/g; particle diameter: 50 nm) as an organonitrogen compound". Evaluations were also carried out in the same way as in Example 30. The results are shown in Table 1-4.

Example 35

A slurry composition for a separator (composite membrane), a separator (composite membrane), a negative electrode, a positive electrode, and a secondary battery were produced in the same way as in Example 28 with the exception that in production of the slurry composition for a separator (composite membrane), "40 parts of azodicarbonamide (ADCA 1) as an organonitrogen compound" was changed to "40 parts of p-toluenesulfonyl hydrazide (TSH 1; 5% mass loss temperature: 140° C.; functional group: hydrazino group; molecular weight: 186; amide group content: 0 mmol/g; particle diameter: 190 nm) as an organonitrogen compound". Evaluations were also carried out in the same way as in Example 28. The results are shown in Table 1-4.

Example 36

A slurry composition for a separator (composite membrane), a separator (composite membrane), a negative electrode, a positive electrode, and a secondary battery were produced in the same way as in Example 30 with the exception that in production of the slurry composition for a separator (composite membrane), "40 parts of azodicarbonamide (ADCA 2) as an organonitrogen compound" was changed to "40 parts of p-toluenesulfonyl hydrazide (TSH 2; 5% mass loss temperature: 140° C.; functional group: hydrazino group; molecular weight: 186; amide group content: 0 mmol/g; particle diameter: 50 nm) as an organonitrogen compound". Evaluations were also carried out in the same way as in Example 30. The results are shown in Table 1-4.

Comparative Example 7

A slurry composition for a separator (composite membrane), a separator (composite membrane), a negative electrode, a positive electrode, and a secondary battery were produced in the same way as in Example 28 with the exception that azodicarbonamide (ADCA 1) was not used as an organonitrogen compound in production of the slurry composition for a separator (composite membrane). Evaluations were also carried out in the same way as in Example 28. The results are shown in Table 1-4.

Comparative Example 8

A slurry composition for a separator (composite membrane), a separator (composite membrane), a negative electrode, a positive electrode, and a secondary battery were produced in the same way as in Example 30 with the exception that azodicarbonamide (ADCA 2) was not used as an organonitrogen compound in production of the slurry composition for a separator (composite membrane). Evaluations were also carried out in the same way as in Example 30. The results are shown in Table 1-4.

TABLE 1-1

| | | Example 1 | Example 2 | Example 3 | Example 4 | Example 5 | Example 6 | Example 7 | Example 8 |
|---|---|---|---|---|---|---|---|---|---|
| Binder | Type | Polymer A | Polymer A | Polymer A | Polymer A | Polymer A | Polymer A | Polymer A | Polymer A |
| | Functional groups | Carboxyl group + hydroxyl group | Carboxyl group + hydroxyl group | Carboxyl group + hydroxyl group | Carboxyl group + hydroxyl group | Carboxyl group + hydroxyl group | Carboxyl group + hydroxyl group | Carboxyl group + hydroxyl group | Carboxyl group + hydroxyl group |
| | Carboxyl group content (mmol/g) | 0.86 | 0.86 | 0.86 | 0.86 | 0.86 | 0.86 | 0.86 | 0.86 |
| | Cyano group content (mmol/g) | — | — | — | — | — | — | — | — |
| Organonitrogen compound | Type | ADCA | ADCA | ADCA | ADCA | TSH | OBSH | TSSC | MBT |
| | 5% mass loss temperature (° C.) | 200 | 200 | 200 | 200 | 140 | 160 | 230 | 315 |
| | Functional group | Azo group | Azo group | Azo group | Azo group | Hydrazino group | Hydrazino group | Hydrazo group | Azo group |
| | Molecular weight | 116 | 116 | 116 | 116 | 186 | 358 | 229 | 133 |
| | Amide group content (mmol/g) | 17.2 | 17.2 | 17.2 | 17.2 | 0 | 0 | 4.4 | 0 |
| | Content relative to binder (mass %) | 35 | 55 | 2 | 100 | 35 | 35 | 35 | 35 |
| Solvent | Type | Water | Water | Water | Water | Water | Water | Water | Water |
| Electrochemical device | Type | LIB | LIB | LIB | LIB | LIB | LIB | LIB | LIB |
| Functional layer | Type | Negative electrode mixed material layer | Negative electrode mixed material layer | Negative electrode mixed material layer | Negative electrode mixed material layer | Negative electrode mixed material layer | Negative electrode mixed material layer | Negative electrode mixed material layer | Negative electrode mixed material layer |
| Evaluation | Peel strength | A | A | B | C | C | C | B | C |
| | Rate characteristics | A | B | B | C | A | A | A | A |
| | Cycle characteristics | A | A | A | A | C | B | A | A |

| | | Example 9 | Example 10 | Example 11 | Example 12 | Example 13 | Example 14 |
|---|---|---|---|---|---|---|---|
| Binder | Type | Polymer B | Polymer C | Polymer D | Polymer E | Polymer F | Polymer G |
| | Functional groups | Carboxyl group + hydroxyl group | Carboxyl group + hydroxyl group + cyano group | Hydroxyl group | Carboxyl group | Carboxyl group | Carboxyl group + cyano group + epoxy group |
| | Carboxyl group content (mmol/g) | 0.35 | 1.04 | — | 4.86 | 9.69 | 0.57 |
| | Cyano group content (mmol/g) | — | 7.36 | — | — | — | 2.57 |

TABLE 1-1-continued

|  |  | | | | | | |
|---|---|---|---|---|---|---|---|
| Organonitrogen compound | Type | ADCA | ADCA | ADCA | ADCA | ADCA | ADCA |
|  | 5% mass loss temperature (° C.) | 200 | 200 | 200 | 200 | 200 | 200 |
|  | Functional group | Azo group | Azo group | Azo group | Azo group | Azo group | Azo group |
|  | Molecular weight | 116 | 116 | 116 | 116 | 116 | 116 |
|  | Amide group content (mmol/g) | 17.2 | 17.2 | 17.2 | 17.2 | 17.2 | 17.2 |
|  | Content relative to binder (mass %) | 35 | 35 | 35 | 35 | 35 | 35 |
| Solvent | Type | Water | Water | Water | Water | Water | Water |
| Electrochemical device | Type | LIB | LIB | LIB | LIB | LIB | LIB |
| Functional layer | Type | Negative electrode mixed material layer | Negative electrode mixed material layer | Negative electrode mixed material layer | Negative electrode mixed material layer | Negative electrode mixed material layer | Negative electrode mixed material layer |
| Evaluation | Peel strength | B | A | C | A | B | B |
|  | Rate characteristics | A | A | C | A | B | A |
|  | Cycle characteristics | A | A | A | A | B | A |

TABLE 1-2

|  |  | Example 15 | Example 16 | Example 17 | Example 18 | Example 19 | Example 20 | Example 21 |
|---|---|---|---|---|---|---|---|---|
| Binder | Type | Polymer H | Polymer I | Polymer J | Polymer K | Polymer L | Polymer I | Polymer G |
|  | Functional groups | Carboxyl group + cyano group + amino group | Carboxyl group + cyano group + amino group | Carboxyl group + cyano group + amino group | Cyano group + sulfo group | Carboxyl group + cyano group | Carboxyl group + cyano group + amino group | Carboxyl group + cyano group + epoxy group |
|  | Carboxyl group content (mmol/g) | 0.4 | 0.23 | 0.14 | — | 0.41 | 0.23 | 0.57 |
|  | Cyano group content (mmol/g) | 30.8 | 11.3 | 1.14 | 21.6 | 2.68 | 11.3 | 2.57 |
| Organonitrogen compound | Type | ADCA | ADCA | ADCA | ADCA | ADCA | OBSC | ADCA |
|  | 5% mass loss temperature (° C.) | 200 | 200 | 200 | 200 | 200 | 215 | 200 |
|  | Functional group | Azo group | Azo group | Azo group | Azo group | Azo group | Hydrazo group | Azo group |
|  | Molecular weight | 116 | 116 | 116 | 116 | 116 | 444 | 116 |
|  | Amide group content (mmol/g) | 17.2 | 17.2 | 17.2 | 17.2 | 17.2 | 2.3 | 17.2 |
|  | Content relative to binder (mass %) | 45 | 45 | 45 | 45 | 45 | 45 | 45 |
| Solvent | Type | NMP | NMP | NMP | NMP | NMP | NMP | Water |
| Electrochemical device | Type | LIB | LIB | LIB | LIB | LIB | LIB | LIB |
| Functional layer | Type | Positive electrode mixed material layer | Positive electrode mixed material layer | Positive electrode mixed material layer | Positive electrode mixed material layer | Positive electrode mixed material layer | Positive electrode mixed material layer | Separator |
|  | Location | — | — | — | — | — | — | Stacked |
| Evaluation | Peel strength | B | A | C | B | B | C | A |
|  | Rate characteristics | C | A | A | B | A | A | A |
|  | Cycle characteristics | A | A | A | A | A | A | A |

|  |  | Example 22 | Example 23 | Example 24 | Comparative Example 1 | Comparative Example 2 | Comparative Example 3 |
|---|---|---|---|---|---|---|---|
| Binder | Type | Polymer G | Polymer G | Polymer A | Polymer M | Polymer A | Polymer A |
|  | Functional groups | Carboxyl group + cyano group + epoxy group | Carboxyl group + cyano group + epoxy group | Carboxyl group + hydroxyl group | — | Carboxyl group + hydroxyl group | Carboxyl group + hydroxyl group |
|  | Carboxyl group content (mmol/g) | 0.57 | 0.57 | 0.86 | — | 0.86 | 0.86 |
|  | Cyano group content (mmol/g) | 2.57 | 2.57 | — | — | — | — |
| Organonitrogen compound | Type | DPT | TSH | ADCA | ADCA | AIBN | — |
|  | 5% mass loss temperature (° C.) | 205 | 140 | 200 | 200 | 108 | — |
|  | Functional group | Nitroso group | Hydrazino group | Azo group | Azo group | Azo group | — |

TABLE 1-2-continued

|  |  |  |  |  |  |  |  |
|---|---|---|---|---|---|---|---|
|  | Molecular weight | 184 | 186 | 116 | 116 | 164 | — |
|  | Amide group content (mmol/g) | 0 | 0 | 17.2 | 17.2 | 0 | — |
|  | Content relative to binder (mass %) | 45 | 45 | 20 | 35 | 35 | — |
| Solvent | Type | Water | Water | Water | NMP | Water | Water |
| Electrochemical device | Type | LIB | LIB | EDLC | LIB | LIB | LIB |
| Functional layer | Type | Separator | Separator | Positive electrode mixed material layer + negative electrode mixed material layer | Negative electrode mixed material layer | Negative electrode mixed material layer | Negative electrode mixed material layer |
|  | Location | Stacked | Stacked | — | — | — | — |
| Evaluation | Peel strength | C | C | A | E | E | D |
|  | Rate characteristics | A | A | A | D | D | D |
|  | Cycle characteristics | A | C | A | D | E | D |

TABLE 1-3

|  |  | Example 25 | Example 26 | Example 27 | Comparative Example 4 | Comparative Example 5 | Comparative Example 6 |
|---|---|---|---|---|---|---|---|
| Binder | Type | Polymer G (ACL) | Polymer G (ACL) | Polymer G (ACL) | Polymer G (ACL) | Polymer G (ACL) | Polymer G (ACL) |
|  | Functional groups | Carboxyl group + cyano group + epoxy group | Carboxyl group + cyano group + epoxy group | Carboxyl group + cyano group + epoxy group | Carboxyl group + cyano group + epoxy group | Carboxyl group + cyano group + epoxy group | Carboxyl group + cyano group + epoxy group |
|  | Carboxyl group content (mmol/g) | 0.57 | 0.57 | 0.57 | 0.57 | 0.57 | 0.57 |
|  | Cyano group content (mmol/g) | 2.57 | 2.57 | 2.57 | 2.57 | 2.57 | 2.57 |
|  | Particle diameter (nm) | 380 | 380 | 380 | 380 | 380 | 380 |
|  | Tg (° C.) | −40 | −40 | −40 | −40 | −40 | −40 |
|  | Content (parts by mass) | 55 | 55 | 55 | 100 | 100 | 100 |
| Organonitrogen compound | Type | ADCA | DPT | TSH | — | — | — |
|  | 5% mass loss temperature (° C.) | 200 | 205 | 140 | — | — | — |
|  | Functional group | Azo group | Nitroso group | Hydrazino group | — | — | — |
|  | Molecular weight | 116 | 184 | 186 | — | — | — |
|  | Amide group content (mmol/g) | 17.2 | 0 | 0 | — | — | — |
|  | Content (parts by weight) | 45 | 45 | 45 | — | — | — |
| Organic particles | Type | Organic particles A | Organic particles B | Organic particles C | Organic particles A | Organic particles B | Organic particles C |
|  | Particle diameter (nm) | 500 | 650 | 500 | 500 | 650 | 500 |
|  | Degree of swelling (%) | 200 | 300 | 1200 | 200 | 300 | 1200 |
|  | Tg (° C.) | 40 | 52 | 45 | 40 | 52 | 45 |
|  | Content (parts by weight) | 1000 | 1000 | 1000 | 1000 | 1000 | 1000 |
| Solvent | Type | Water | Water | Water | Water | Water | Water |
| Electrochemical device | Type | LIB | LIB | LIB | LIB | LIB | LIB |
| Functional layer | Type | Separator | Separator | Separator | Separator | Separator | Separator |
|  | Location | Stacked | Stacked | Stacked | Stacked | Stacked | Stacked |
| Evaluation | Peel strength | A | C | C | D | D | D |
|  | Process adhesiveness | A | B | B | D | E | E |
|  | Rate characteristics | A | A | A | D | D | D |
|  | Cycle characteristics | A | A | C | D | D | D |

TABLE 1-4

|  |  | Example 28 | Example 29 | Example 30 | Example 31 | Example 32 | Example 33 |
|---|---|---|---|---|---|---|---|
| Binder | Type | Polymer G (ACL) | Polymer G (ACL) | Polymer G (ACL) | Polymer G (ACL) | Polymer G (ACL) | Polymer G (ACL) |
|  | Functional groups | Carboxyl group + cyano group + epoxy group | Carboxyl group + cyano group + epoxy group | Carboxyl group + cyano group + epoxy group | Carboxyl group + cyano group + epoxy group | Carboxyl group + cyano group + epoxy group | Carboxyl group + cyano group + epoxy group |

TABLE 1-4-continued

|  |  |  |  |  |  |  |  |
|---|---|---|---|---|---|---|---|
|  | Carboxyl group content (mmol/g) | 0.57 | 0.57 | 0.57 | 0.57 | 0.57 | 0.57 |
|  | Cyano group content (mmol/g) | 2.57 | 2.57 | 2.57 | 2.57 | 2.57 | 2.57 |
|  | Particle diameter (nm) | 190 | 190 | 50 | 50 | 50 | 190 |
|  | Content (parts by mass) | 60 | 60 | 60 | 60 | 60 | 60 |
| Organonitrogen compound | Type | ADCA 1 | ADCA 1 | ADCA 2 | ADCA 2 | ADCA 2 | DPT 1 |
|  | 5% mass loss temperature (° C.) | 200 | 200 | 200 | 200 | 200 | 205 |
|  | Functional group | Azo group | Azo group | Azo group | Azo group | Azo group | Nitroso group |
|  | Molecular weight | 116 | 116 | 116 | 116 | 116 | 184 |
|  | Amide group content (mmol/g) | 17.2 | 17.2 | 17.2 | 17.2 | 17.2 | 0 |
|  | Content (parts by mass) | 40 | 10 | 40 | 40 | 10 | 40 |
|  | Particle diameter (nm) | 190 | 190 | 50 | 50 | 50 | 190 |
| Non-conductive particles | Type | — | AKP30 (Sumitomo Chemical) | — | — | AEROXIDE Alu 65 (Nippon Aerosil) | — |
|  | Particle diameter (nm) | — | 300 | — | — | 25 | — |
|  | Content (parts by mass) | — | 30 | — | — | 30 | — |
| Solvent | Type | Water | Water | Water | Water | Water | Water |
| Electrochemical device | Type | LIB | LIB | LIB | LIB | LIB | LIB |
| Functional layer | Type | Separator | Separator | Separator | Separator | Separator | Separator |
|  | Location | Stacked | Stacked | Internal | Stacked | Internal | Stacked |
| Evaluation | Peel strength | A | B | A | A | B | C |
|  | Value for air resistance increase | A | B | A | B | A | B |
|  | Rate characteristics | A | A | A | B | B | A |
|  | Cycle characteristics | A | A | A | B | B | A |

|  |  |  | Example 34 | Example 35 | Example 36 | Comparative Example 7 | Comparative Example 8 |
|---|---|---|---|---|---|---|---|
|  | Binder | Type | Polymer G (ACL) | Polymer G (ACL) | Polymer G (ACL) | Polymer G (ACL) | Polymer G (ACL) |
|  |  | Functional groups | Carboxyl group + cyano group + epoxy group | Carboxyl group + cyano group + epoxy group | Carboxyl group + cyano group + epoxy group | Carboxyl group + cyano group + epoxy group | Carboxyl group + cyano group + epoxy group |
|  |  | Carboxyl group content (mmol/g) | 0.57 | 0.57 | 0.57 | 0.57 | 0.57 |
|  |  | Cyano group content (mmol/g) | 2.57 | 2.57 | 2.57 | 2.57 | 2.57 |
|  |  | Particle diameter (nm) | 50 | 190 | 50 | 190 | 50 |
|  |  | Content (parts by mass) | 60 | 60 | 60 | 60 | 60 |
|  | Organonitrogen compound | Type | DPT 2 | TSH 1 | TSH 2 | — | — |
|  |  | 5% mass loss temperature (° C.) | 205 | 140 | 140 | — | — |
|  |  | Functional group | Nitroso group | Hydrazino group | Hydrazino group | — | — |
|  |  | Molecular weight | 184 | 186 | 186 | — | — |
|  |  | Amide group content (mmol/g) | 0 | 0 | 0 | — | — |
|  |  | Content (parts by mass) | 40 | 40 | 40 | — | — |
|  |  | Particle diameter (nm) | 50 | 190 | 50 | — | — |
|  | Non-conductive particles | Type | — | — | — | — | — |
|  |  | Particle diameter (nm) | — | — | — | — | — |
|  |  | Content (parts by mass) | — | — | — | — | — |
|  | Solvent | Type | Water | Water | Water | Water | Water |
|  | Electrochemical device | Type | LIB | LIB | LIB | LIB | LIB |
|  | Functional layer | Type | Separator | Separator | Separator | Separator | Separator |
|  |  | Location | Internal | Stacked | Internal | Stacked | Internal |
|  | Evaluation | Peel strength | C | C | C | D | D |
|  |  | Value for air resistance increase | B | B | B | D | E |
|  |  | Rate characteristics | A | A | A | D | D |
|  |  | Cycle characteristics | A | C | C | D | D |

It can be seen from Tables 1-1 and 1-2 that in Examples 1 to 24 in which a binder composition was used that contained a specific binder and a specific organonitrogen compound, it was possible to cause a functional layer to display excellent adhesiveness (peel strength) while also improving rate characteristics and cycle characteristics of a secondary battery.

On the other hand, it can be seen from Table 1-2 that in Comparative Example 1 in which a binder composition was used that contained a specific organonitrogen compound but did not contain a specific binder, it was not possible to cause a functional layer to display excellent adhesiveness (peel strength) while also improving rate characteristics and cycle characteristics of a secondary battery. Moreover, it can be seen from Table 1-2 that in Comparative Examples 2 and 3 in which a binder composition was used that contained a specific binder but did not contain a specific organonitrogen compound, it was not possible to cause a functional layer to display excellent adhesiveness (peel strength) while also improving rate characteristics and cycle characteristics of a secondary battery.

It can be seen from Table 1-3 that in Examples 25 to 27 in which a binder composition was used that contained a specific binder, a specific organonitrogen compound, and specific organic particles, it was possible to cause an adhesive layer to display excellent adhesiveness (peel strength and process adhesiveness) while also improving rate characteristics and cycle characteristics of a secondary battery.

Also, it can be seen from Table 1-4 that in Examples 28 to 36 in which a binder composition was used that contained a specific binder and a specific organonitrogen compound, it was possible to cause a composite membrane to display excellent adhesiveness (peel strength), cause a separator (composite membrane) to display an excellent value for air resistance increase, and improve rate characteristics and cycle characteristics of a secondary battery.

INDUSTRIAL APPLICABILITY

According to the present disclosure, it is possible to provide a binder composition for an electrochemical device that has excellent binding capacity and is capable of forming a functional layer (electrode mixed material layer, porous membrane layer, or adhesive layer) or a composite membrane that can improve rate characteristics and cycle characteristics of an electrochemical device (for example, a secondary battery).

Moreover, according to the present disclosure, it is possible to provide a slurry composition for an electrochemical device functional layer capable of forming a functional layer (electrode mixed material layer, porous membrane layer, or adhesive layer) or a composite membrane that has excellent adhesiveness (peel strength and process adhesiveness) and that can improve rate characteristics and cycle characteristics of an electrochemical device (for example, a secondary battery).

Furthermore, according to the present disclosure, it is possible to provide a composite membrane that has excellent adhesiveness (peel strength) and that can improve rate characteristics and cycle characteristics of an electrochemical device (for example, a secondary battery).

The invention claimed is:

1. A slurry composition for an electrochemical device functional layer comprising a binder, an organonitrogen compound, and an electrode active material, wherein
    the binder is a polymer including a cyano group, and cyano group content in the binder is not less than 1.0 mmol and not more than 40 mmol per 1 g of the binder,
    the organonitrogen compound is at least one selected from the group consisting of azodicarbonamide, oxybis(benzenesulfonyl hydrazide), dinitrosopentamethylenetetramine, hydrazo dicarbonamide, trihydrazine triazine, p-toluenesulfonyl semicarbazide, p,p'-oxybis(benzenesulfonyl semicarbazide), barium azodicarboxylate, p-toluenesulfonyl hydrazide, and 5-methyl-1H-benzotriazole and
    content of the organonitrogen compound relative to 100 mass % of the binder is not less than 20 mass % and not more than 85 mass %.

2. The slurry composition for an electrochemical device functional layer according to claim 1, wherein
    the binder includes a carboxyl group, and
    carboxyl group content in the binder is not less than 0.01 mmol and not more than 15 mmol per 1 g of the binder.

3. The slurry composition for an electrochemical device functional layer according to claim 1, wherein
    the binder includes a cyano group-containing monomer unit, and
    the cyano group-containing monomer unit is selected from the group consisting of acrylonitrile unit, methacrylonitrile unit, fumaronitrile unit, allyl cyanide unit, 2-methylene glutaronitrile unit, and cyanoacrylate unit.

4. A slurry composition for an electrochemical device functional layer comprising a binder, an organonitrogen compound and non-conductive particles, wherein
    the binder is a polymer including a cyano group, and cyano group content in the binder is not less than 1.0 mmol and not more than 40 mmol per 1 g of the binder,
    the organonitrogen compound is at least one selected from the group consisting of azodicarbonamide, oxybis(benzenesulfonyl hydrazide), dinitrosopentamethylenetetramine, hydrazo dicarbonamide, trihydrazine triazine, p-toluenesulfonyl semicarbazide, p,p'-oxybis(benzenesulfonyl semicarbazide), barium azodicarboxylate, p-toluenesulfonyl hydrazide, and 5-methyl-1H-benzotriazole, and
    content of the organonitrogen compound relative to 100 mass % of the binder is not less than 20 mass % and not more than 85 mass %.

5. The slurry composition for an electrochemical device functional layer according to claim 4, wherein
    the binder further includes a carboxyl group, and
    carboxyl group content in the binder is not less than 0.01 mmol and not more than 15 mmol per 1 g of the binder.

6. The slurry composition for an electrochemical device functional layer according to claim 4, wherein
    the binder includes a cyano group-containing monomer unit, and
    the cyano group-containing monomer unit is selected from the group consisting of acrylonitrile unit, methacrylonitrile unit, fumaronitrile unit, allyl cyanide unit, 2-methylene glutaronitrile unit, and cyanoacrylate unit.

7. The slurry composition for an electrochemical device functional layer according to claim 4, wherein
    the non-conductive particles are alumina.

8. A composite membrane obtained through the slurry composition according to claim 4 being stacked on a separator substrate or introduced into a separator substrate.

* * * * *